United States Patent
Kim et al.

(10) Patent No.: US 10,299,292 B2
(45) Date of Patent: May 21, 2019

(54) METHOD AND DEVICE FOR DETECTING RACH PREAMBLE COLLISION CAUSED BY MULTI-PATH CHANNEL IN WIRELESS COMMUNICATION SYSTEM

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Kungmin Park, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/549,361

(22) PCT Filed: Feb. 15, 2016

(86) PCT No.: PCT/KR2016/001475
§ 371 (c)(1),
(2) Date: Aug. 7, 2017

(87) PCT Pub. No.: WO2016/129970
PCT Pub. Date: Aug. 18, 2016

(65) Prior Publication Data
US 2018/0042050 A1    Feb. 8, 2018

Related U.S. Application Data

(60) Provisional application No. 62/116,558, filed on Feb. 15, 2015.

(51) Int. Cl.
*H04W 74/00*     (2009.01)
*H04W 74/08*     (2009.01)
(Continued)

(52) U.S. Cl.
CPC ..... *H04W 74/0825* (2013.01); *H04J 13/0062* (2013.01); *H04W 74/008* (2013.01);
(Continued)

(58) Field of Classification Search
CPC ......... H04W 74/00825; H04W 74/008; H04W 74/0858; H04W 74/0875; H04W 88/08; H04W 76/27; H04J 13/0062
See application file for complete search history.

(56) References Cited

U.S. PATENT DOCUMENTS

| | | | |
|---|---|---|---|
| 6,711,403 B1 * | 3/2004 | Herrmann | H04B 1/707 375/130 |
| 2001/0026543 A1 * | 10/2001 | Hwang | H04B 7/2628 370/335 |

(Continued)

FOREIGN PATENT DOCUMENTS

| | | |
|---|---|---|
| KR | 100818630 | 4/2008 |
| KR | 1020100059804 | 6/2010 |
| KR | 1020110138385 | 12/2011 |
| WO | 2009116819 | * 9/2009 |
| WO | 2013009052 | 1/2013 |

OTHER PUBLICATIONS

PCT International Application No. PCT/KR2016/001475, International Search Report dated May 18, 2016, 2 pages.

*Primary Examiner* — Afsar M Qureshi
(74) *Attorney, Agent, or Firm* — Lee Hong Degerman Kang Waimey

(57) ABSTRACT

Provided is a method for detecting whether a random access channel (RACH) preamble collision occurs in a wireless communication system. An evolved Node B (eNB) receives, from a first user equipment (UE), a first RACH preamble generated by using a combination of a plurality of sequences, and also receives, from a second UE, a second RACH preamble generated by using one sequence. The eNB detects whether a collision occurs between the first RACH preamble and the second RACH preamble on the basis of the
(Continued)

received patterns of the first RACH preamble and the second RACH preamble, wherein the received patterns of the first RACH preamble and the second RACH preamble are based on channel delay caused by multiple paths.

14 Claims, 29 Drawing Sheets

(51) Int. Cl.
*H04W 76/10* (2018.01)
*H04W 88/08* (2009.01)
*H04J 13/00* (2011.01)
*H04W 76/27* (2018.01)

(52) U.S. Cl.
CPC ....... *H04W 74/0858* (2013.01); *H04W 88/08* (2013.01); *H04W 74/0875* (2013.01); *H04W 76/10* (2018.02); *H04W 76/27* (2018.02)

(56) References Cited

U.S. PATENT DOCUMENTS

| | | | | |
|---|---|---|---|---|
| 2001/0046220 A1* | 11/2001 | Koo | ..................... | H04B 7/2637 370/335 |
| 2001/0053140 A1* | 12/2001 | Choi | ..................... | H04B 7/264 370/335 |
| 2012/0033613 A1* | 2/2012 | Lin | ..................... | H04W 74/085 370/328 |

\* cited by examiner

METHOD AND DEVICE FOR DETECTING RACH PREAMBLE COLLISION CAUSED BY MULTI-PATH CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2016/001475, filed on Feb. 15, 2016, which claims the benefit of U.S. Provisional Application No. 62/116,558, filed on Feb. 15, 2015, the contents of which are all hereby incorporated by reference herein in their entirety.

BACKGROUND OF THE INVENTION

Field of the Invention

The present invention relates to wireless communication, and more particularly, to a method and a device for detecting a random access channel (RACH) preamble collision by a multi-path channel in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In 3GPP LTE, a random access procedure may be performed. A major use of the random access procedure is uplink (UL) initial access and the transmission of a short message. In wideband code division multiple access (WCDMA), initial network access and the transmission of a short message are performed through the random access procedure. In contrast, in 3GPP LTE, a short message is not transmitted through the random access procedure. Furthermore, in 3GPP LTE, a random access channel (RACH) for the random access procedure may be transmitted separately from an UL data transmission channel. More specifically, in 3GPP LTE, the random access procedure may be performed in the following cases.

(1) A UE in radio resource control (RRC) connected state (RRC_CONNECTED), but not uplink-synchronized, needing to send new UL data or control information (e.g. an event-triggered measurement report)

(2) A UE in RRC_CONNECTED, but not uplink-synchronized, needing to receive new downlink (DL) data, and therefore to transmit corresponding acknowledgement/non-acknowledgement (ACK/NACK) in the UL (3) A UE in RRC_CONNECTED, handing over from its current serving cell to a target cell (4) For positioning purposes in RRC_CONNECTED, when timing advance is needed for UE positioning (5) A transition from RRC idle state (RRC_IDLE) to RRC_CONNECTED, for example for initial access or tracking area updates (6) Recovering from radio link failure In general, a UE that has not obtained UL synchronization or has not maintained UL synchronization obtains UL timing synchronization using a random access procedure. If the UL synchronization of a UE has been obtained, an evolved NodeB (eNB) may schedule transmission resources with orthogonality. A UE may perform UL transmission only when UL synchronization has been formed between the UE and a BS and receive scheduling for data transmission from the eNB. That is, through the random access procedure, a UE that has not been synchronized may perform wireless access using a transmission scheme that is orthogonal or that is not overlapped to a maximum extent.

In general, an RACH preamble transmitted in the random access procedure in order to obtain the UL synchronization is operated based on non-coherent detection. Therefore, the eNB may recognize the RACH preamble which is simultaneously from a plurality of UEs at a specific time as the collision. However, when a time delay by a multiple-path channel occurs, it is difficult for the eNB to immediately determine whether the RACH preambles collide with each other. Accordingly, when the time delay by the multiple-path channel occurs, improvement of the random access procedure for preventing the collision of the RACH preamble is required.

SUMMARY OF THE INVENTION

The present invention provides a method and a device for detecting a random access channel (RACH) preamble collision by a multi-path channel in a wireless communication system. The present invention also provides a method and a device which can provide precedence connection support in consideration with a service type of user equipment (UE) and emergency by enhancing a structure of the RACH preamble of a random access procedure in the related art in a wireless channel environment in which a channel delay by the multi-path channel occurs. The present invention also provides a method and a device which preferentially transmits a random access response to a specific user by allowing a base station to distinguish whether the RACH preambles collide with each other between the UEs even though the channel delay by the multi-path channel occurs by adopting a multi quality of service (QoS) concept.

In an aspect, a method for detecting whether a random access channel (RACH) preamble collision occurs by evolved NodeB (eNB) in a wireless communication system is provided. The method includes receiving, from a first user equipment (UE), a first RACH preamble generated by using a combination of a plurality of sequences, receiving, from a second UE, a second RACH preamble generated by using one sequence, and detecting whether a collision occurs between the first RACH preamble and the second RACH preamble on the basis of the received patterns of the first RACH preamble and the second RACH preamble. The received patterns of the first RACH preamble and the second RACH preamble are based on channel delay by multiple paths.

In another aspect, an evolved NodeB (eNB) in a wireless communication system is provided. The eNB includes a memory, a transceiver, and a processor connected with the memory and the transceiver. The processor is configured to control the transceiver to receive, from a first user equipment (UE), a first RACH preamble generated by using a combination of a plurality of sequences, control the transceiver to receive, from a second UE, a second RACH preamble generated by using one sequence, and detect whether a collision occurs between the first RACH preamble and the second RACH preamble on the basis of the received patterns of the first RACH preamble and the second RACH preamble. The received patterns of the first RACH preamble and the second RACH preamble are based on channel delay by multiple paths.

In a wireless channel environment in which a channel delay by the multi-path channel occurs, a collision of random access channel (RACH) preambles can be detected and prevented.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
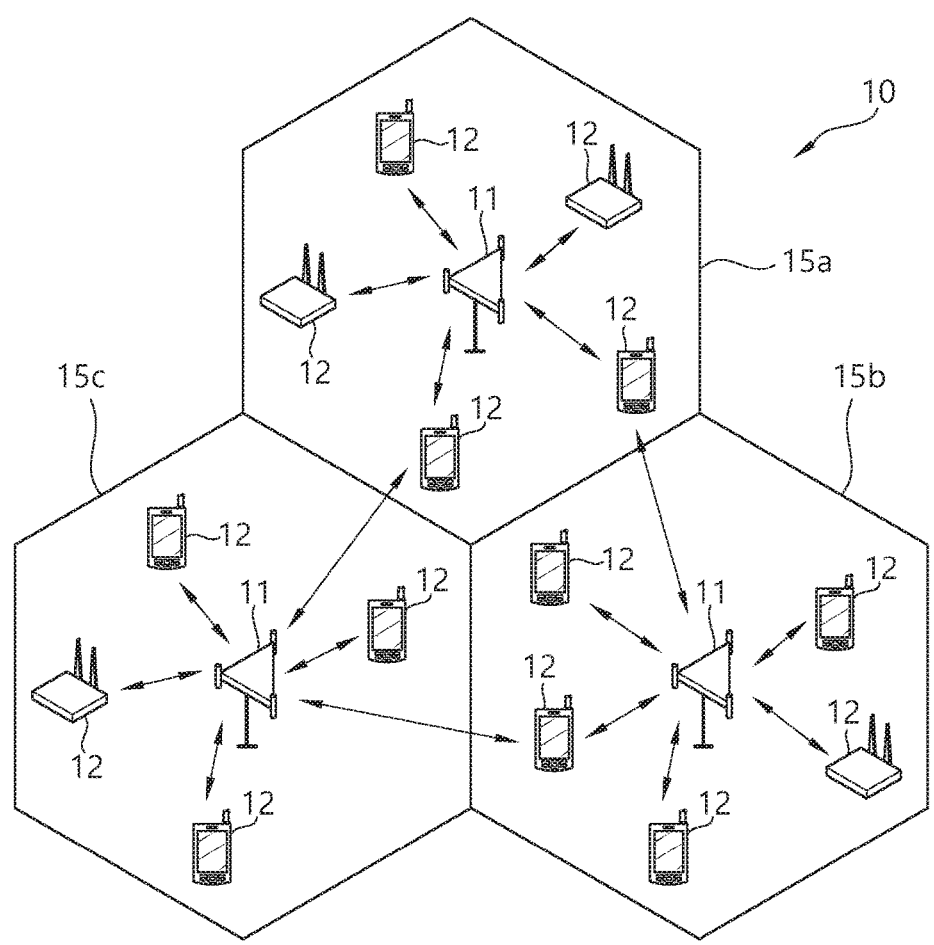
FIG. 1 shows a cellular system.

FIG. 1 shows a cellular system. Referring to FIG. 1, the cellular system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. An eNB providing a communication service to the serving cell is called a serving eNB. The cellular system includes a different cell adjacent to the serving cell. The different cell adjacent to the serving cell is called a neighbor cell. An eNB providing a communication service to the neighbor cell is called a neighbor eNB. The serving cell and the neighbor cell are relatively determined based on a UE.

This technique can be used for downlink (DL) or uplink (UL). In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
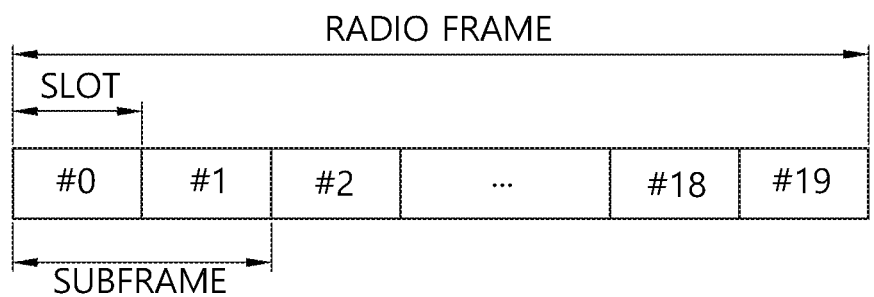
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
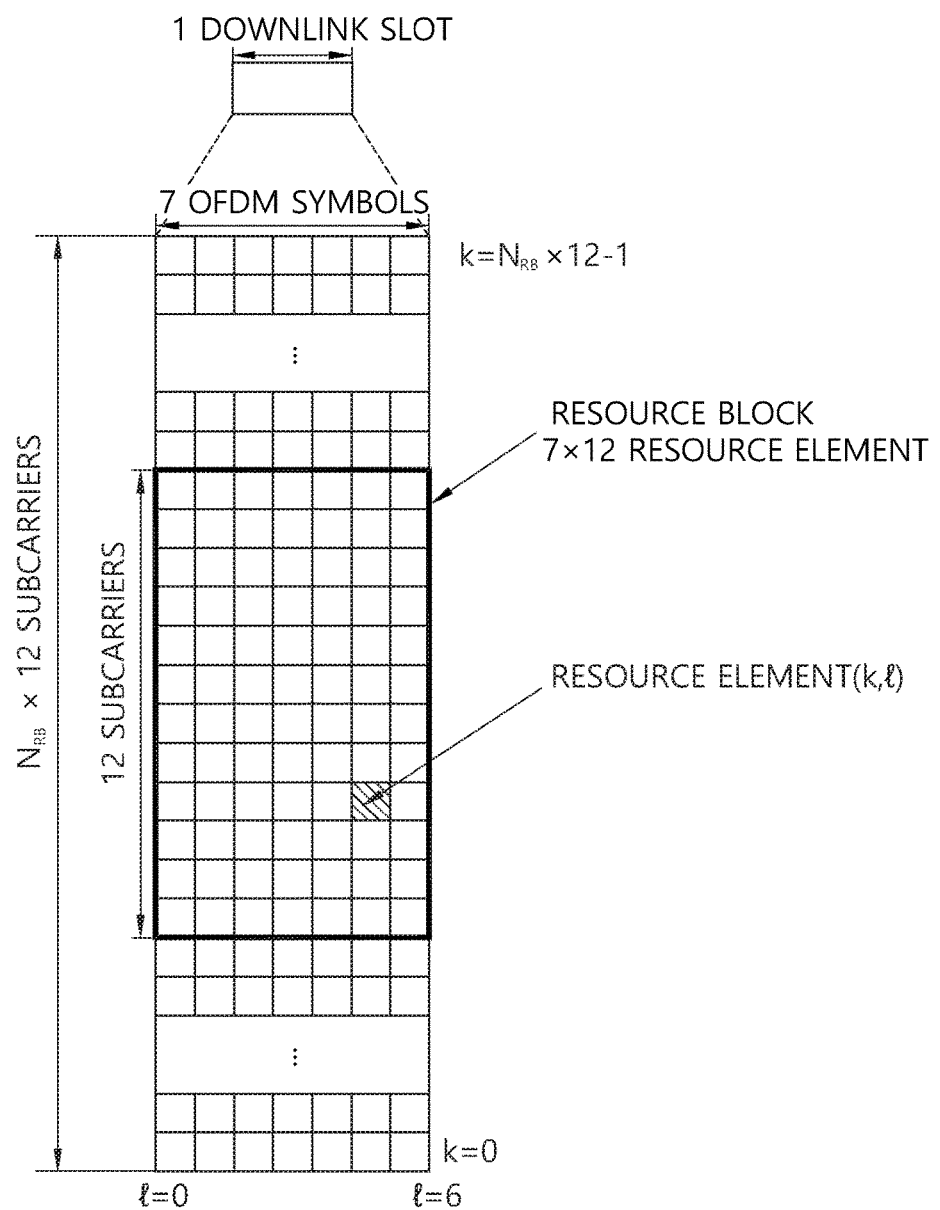
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a cyclic prefix (CP), frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
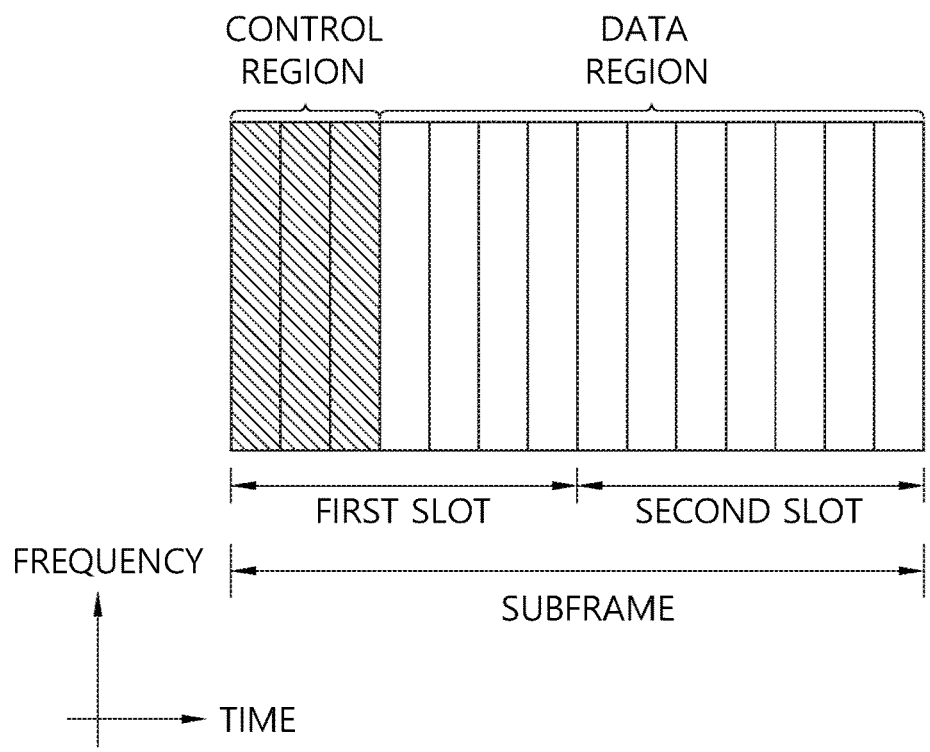
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE may include a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
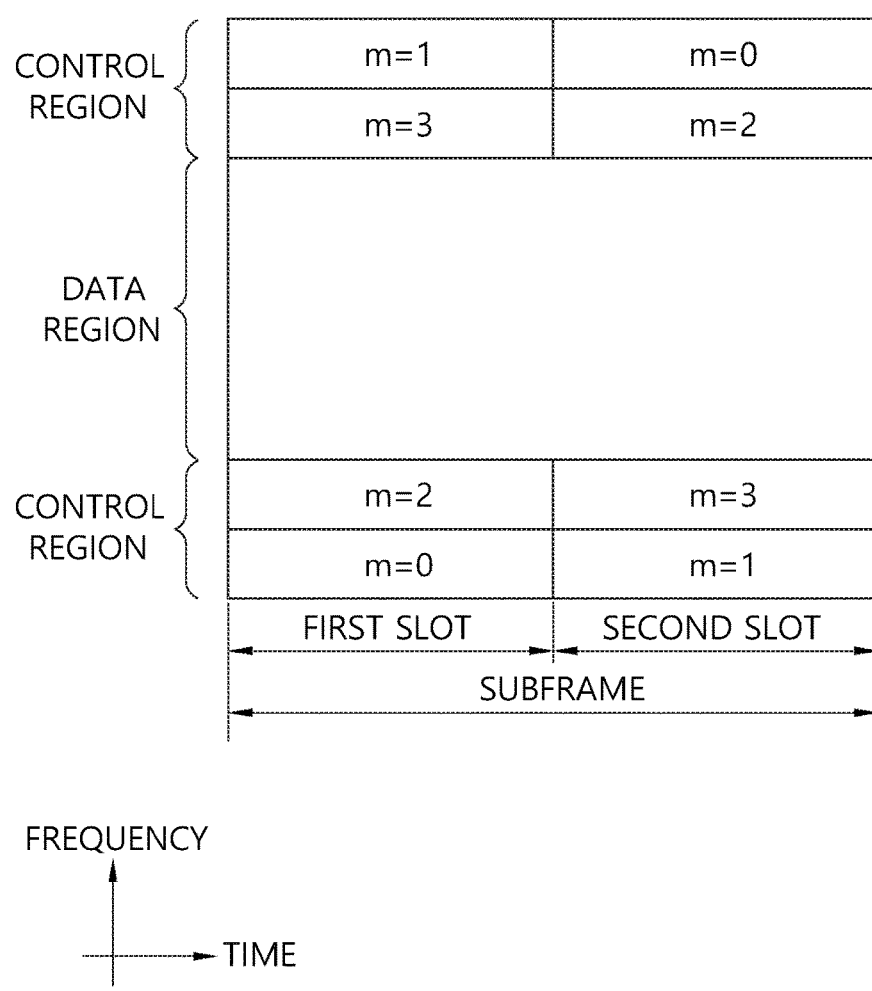
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR) which is a request for UL radio resource allocation, and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

A random access procedure may be divided into a contention-based random access procedure and a non-contention-based random access procedure. First, in the contention-based random access procedure, different UEs are permitted to simultaneously access an eNB using the same RACH preamble. Accordingly, a contention may occur. In order to process such a contention, an additional contention resolution step is required.

Figure 6:
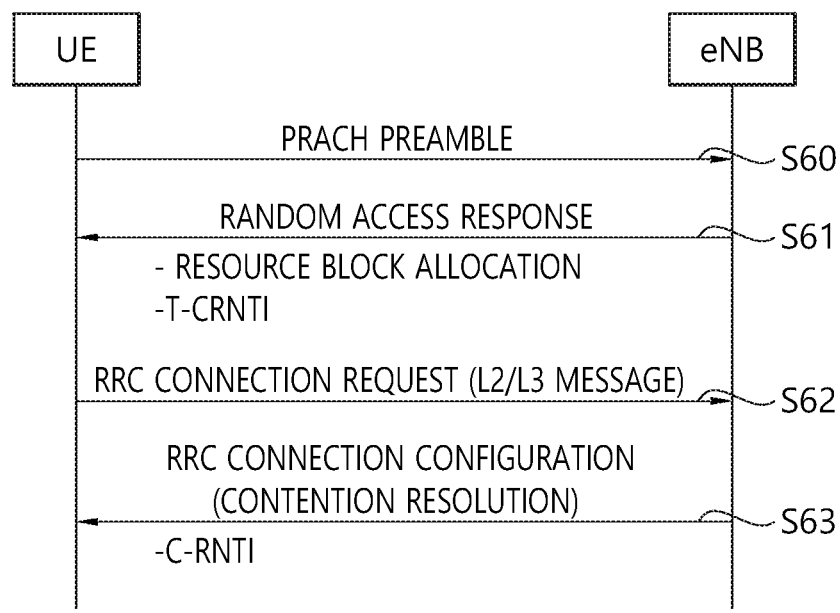
FIG. 6 shows a contention-based random access procedure.

FIG. 6 shows a contention-based random access procedure.

At step S60, a UE transmits an RACH preamble to an eNB. The RACH preamble may be called a "message 1". The RACH preamble may include an RA-RNTI. The RA-RNTI may be determined as (1+t_id+10*f_id). t_id is the index of the first subframe of the specified physical random access channel (PRACH) (0≤t_id<10), and f_id is the index of the specified PRACH within that subframe, in ascending order of frequency domain (0≤f_id<6). The eNB may obtain the RA-RNTI by decoding the RACH preamble.

At step S61, the eNB transmits a random access response to the UE. The random access response may be called a "message 2". The random access response may include the RA-RNTI obtained by decoding the RACH preamble by the eNB, a TA, a temporary C-RNTI, and a resource block assignment (i.e., an UL grant for an L2/L3 message). The UE may obtain the resource block assignment and a modulation and coding scheme (MCS) configuration by decoding the random access response. The eNB may be configured to receive an RRC connection request message through the DCI format 0.

At step S62, the UE transmits an L2/L3 message, that is, an RRC connection request message, to the eNB. The RRC connection request message may be called a "message 3". The UE may transmit the RRC connection request message using the temporary C-RNTI obtained from the random access response.

At step S63, if the RRC connection request message transmitted by the UE has been successfully decoded, the eNB transmits HARQ ACK to the corresponding UE. Accordingly, the UE may be aware that the random access procedure has been successful. Such a process is called a contention resolution process. More specifically, the eNB transmits an RRC connection setup message to the UE using the temporary C-RNTI in response to the RRC connection request message. The RRC connection setup message may be called a "message 4". The RRC connection setup message may include a C-RNTI. From this point of time, the UE and the eNB may exchange messages using the C-RNTI.

If the UE has not received the HARQ ACK, the UE may return to step S60 and transmit the RACH preamble to the eNB.

In a non-contention-based random access procedure, a contention is not permitted for a reason of timing restriction. An eNB may indicate that each UE has to transmit which RACH preamble when. To this end, a UE has to be in a connected state (RRC_CONNECTED) prior to the random access procedure. For example, a non-contention-based random access procedure may be performed during handover. In the non-contention-based random access procedure, first, an eNB transmits an RACH preamble assignment to a UE. The UE transmits an RACH preamble, including an RA-RNTI and an indication of the size of an L2/L3 message, to the eNB based on the received RACH preamble assignment. The eNB that has received the RACH preamble transmits a random access response, including a TA, a C-RNTI, and an UL grant for an L2/L3 message, to the UE. Accordingly, the non-contention-based random access procedure may be completed.

Figure 7:
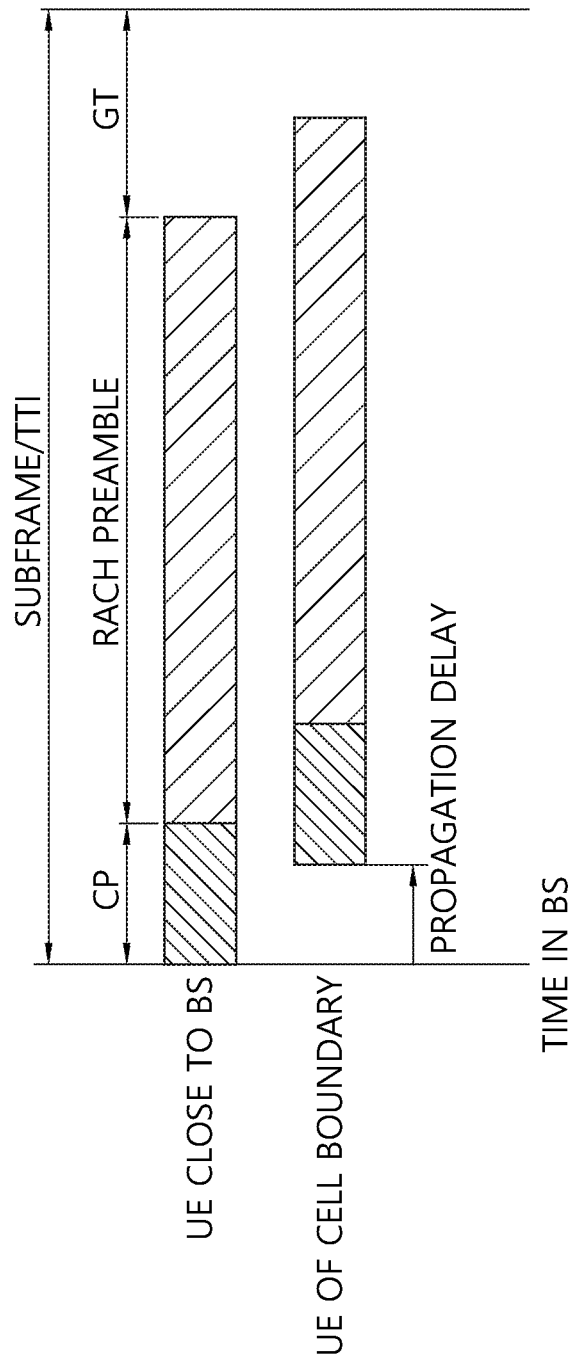
FIG. 7 shows an example of a structure of an RACH preamble.

FIG. 7 shows an example of a structure of an RACH preamble. Referring to FIG. 7, the RACH preamble consists of a CP, a sequence, and a guard time (GT). The CP absorbs maximum channel delay spread and a round trip time (RTT), and the GT absorbs the RTT. The CP is generated by inserting the latter part of an existing OFDM symbol into the CP interval of the RACH preamble. Accordingly, a periodic correlation in an eNB that receives the RACH preamble may be possible. A UE may transmit an RACH preamble, assuming that it has been synchronized with the eNB (i.e., a timing advance (TA)=0 ms). Accordingly, an RACH preamble transmitted by a UE close to the eNB is received by the eNB without a delay, and an RACH preamble transmitted by a UE distant from the eNB is received by the eNB with a propagation delay. In this case, the eNB may perform a random access procedure depending on the location where the RACH preamble transmitted by each UE was detected through a periodic correlation because it is aware of a sequence transmitted by each UE.

Several sequences may be used for an RACH preamble. Representatively, an auto-correlation-based Zadoff-Chu (ZC) sequence and a cross-correlation-based pseudo-random sequence may be used for an RACH preamble. In general, the auto-correlation-based sequence may be used in a situation in which intra-cell interference is small, and the cross-correlation sequence may be used in a situation in which intra-cell interference is great. In 3GPP LTE, a ZC sequence of 839 in length may be used for an RACH preamble. The ZC sequence used for the RACH preamble may satisfy the following conditions.

Intra-cell interference between different RACH preambles using the same frequency-time RACH resources is relatively small.

Intra-cell interference may be optimized depending on the size of a cell. That is, in order to improve detection performance of an eNB, more orthogonal preambles may be generated for a smaller cell.

Detection performance is improved as the number of orthogonal preambles is increased. (3GPP LTE is 64 signatures, and WCDMA is 16 signatures)

Detection complexity of an eNB is relatively small.

A high-speed UE can be supported.

When intra-cell interference between signatures is great, a PN sequence may be used for an RACH preamble.

A constant amplitude zero auto-correlation (CAZAC) sequence is described below.

Figure 8:
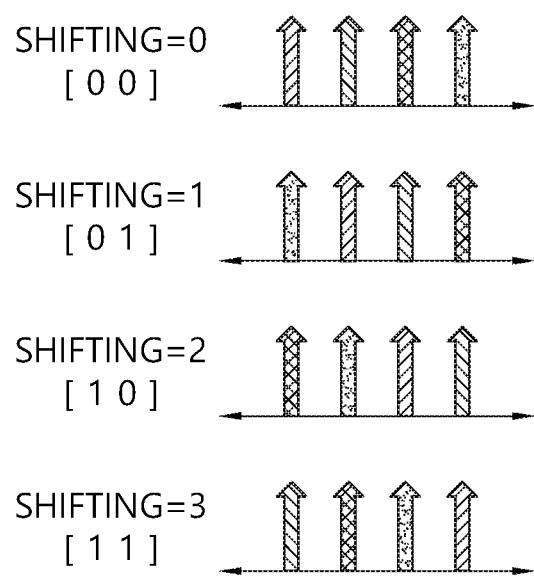
FIG. 8 shows an example of a CAZAC sequence set.

FIG. 8 shows an example of a CAZAC sequence set. Referring to FIG. 8, each sequence within the CAZAC sequence set has a different cyclic shifting (0, 1, 2, or 3). Furthermore, each sequence within the CAZAC sequence set is mapped to specific bits. In this case, each sequence becomes a single signature having specific information. Referring to FIG. 8, [0 0] is mapped to a sequence having a cyclic shifting of 0, [0 1] is mapped to a sequence having a cyclic shifting of 1, [1 0] is mapped to a sequence having a cyclic shifting of 2, and [1 1] is mapped to a sequence having a cyclic shifting of 3, respectively. That is, in FIG. 8, a transmitter may transmit information of 2 bits.

When the transmitter transmits a single sequence within a CAZAC sequence set, a receiver may identify the sequence and determine information mapped to a corresponding sequence. For example, when the receiver identifies the sequence having the cyclic shifting of 0, it may be aware that the transmitter has transmitted information of [0 0]. Assuming an additive white Gaussian noise (AWGN) channel and an environment not including a noise, the receiver may identify a transmitted sequence by finding an output value having the greatest size.

Performance of the CAZAC sequence set defined in FIG. 8 may be greatly deteriorated in a multi-path environment. In order to solve such a problem, in commercialized systems, such as 3GPP LTE, a CAZAC sequence set may be defined by taking into consideration a zero-correlation zone (ZCZ), that is, a valid delay period.

Figure 9:
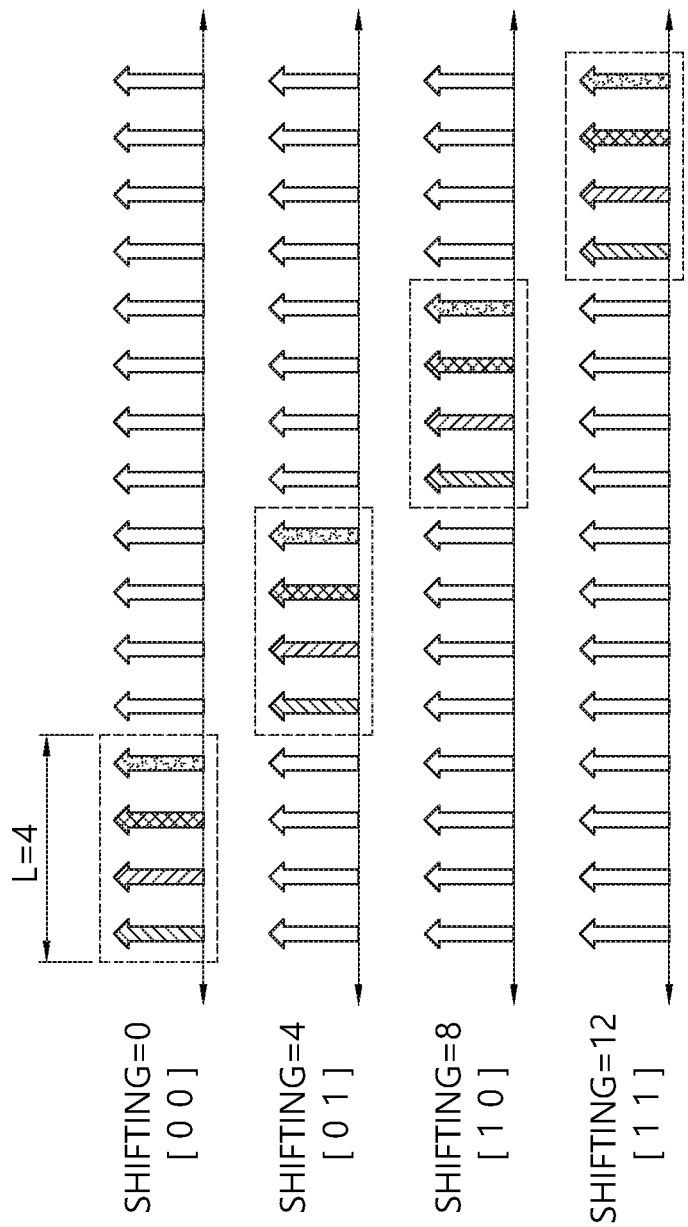
FIG. 9 shows another example of a CAZAC sequence set.

FIG. 9 shows another example of a CAZAC sequence set. Referring to FIG. 9, each sequence within the CAZAC sequence set has a different cyclic shifting (0, 4, 8, or 12). That is, compared to the CAZAC sequence set of FIG. 8, each sequence within the CAZAC sequence set of FIG. 9 is generated by setting an interval between cyclic shiftings to 4. In this case, the interval may be determined by a channel valid delay period L (i.e., the location of the last tap of a channel in a time axis).

Figure 10:
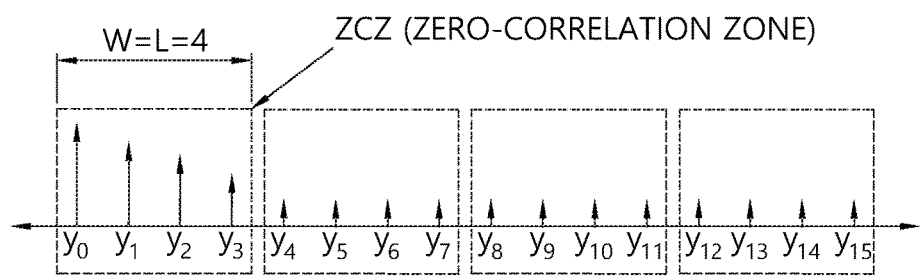
FIG. 10 shows an example of output of a receiver that has receives a sequence within a CAZAC sequence set.

FIG. 10 shows an example of output of a receiver that has receives a sequence within a CAZAC sequence set. FIG. 10 corresponds to the output of the receiver that has received a sequence having a cyclic shifting of 0 in FIG. 9, assuming an environment not including a receiver noise. Referring to FIG. 10, the size W of a ZCZ may be determined to a maximum of cyclic shifting (=L) of a sequence. A receiver first selects the greatest output value $y_i$ in each of ZCZs one by one, performs a comparison on the selected output values $y_i$, and selects a ZCZ having the greatest output value. That is, the receiver may select the first ZCZ. Four output values $\{y_0, y_1, y_2, y_3\}$ having different sizes are present in the first ZCZ unlike in other ZCZs, and this has been generated due to the influence of delay spread. However, the receiver may identify a sequence transmitted by a transmitter by setting the size W of a ZCZ greater than the channel valid delay period L.

Meanwhile, more signatures may be defined as the interval of cyclic shiftings between sequences is reduced. For example, in FIG. 9, if the interval between cyclic shiftings is set to 1, a total of 16 signatures may be defined.

A multi quality of service (QoS) sequence is described below. The multi-QoS sequence may be generated based on an asymmetric CAZAC sequence set. The asymmetric CAZAC sequence set means a CAZAC sequence set having different intervals of cyclic shiftings between sequences in a time domain. In contrast, the CAZAC sequence set described in FIG. 8 and FIG. 9 may be called a symmetric CAZAC sequence set because the interval of cyclic shiftings between sequences is the same, that is, 1 and 4. In an asymmetric CAZAC sequence set, bits may be mapped to each sequence so that sequences having a small difference between cyclic shiftings share a specific bit. Furthermore, information having higher importance may be mapped to a shared bit.

Figure 11:
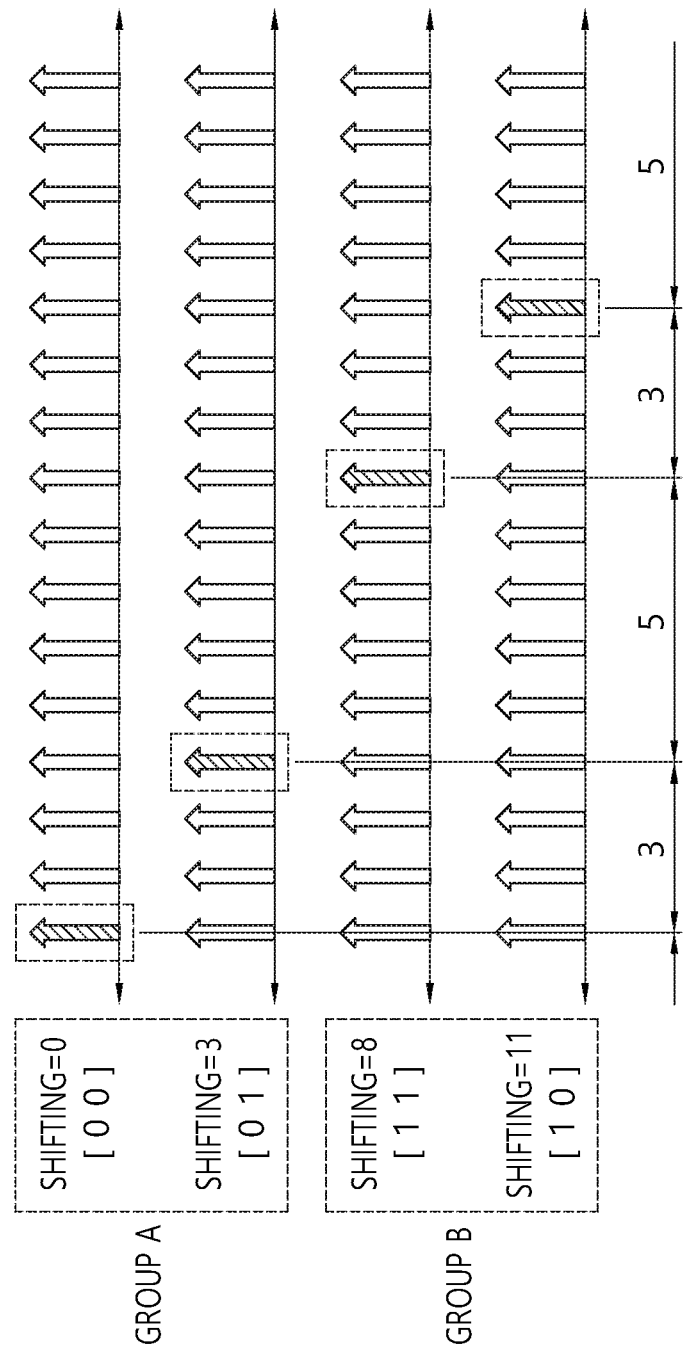
FIG. 11 shows an example of an asymmetric CAZAC sequence set.

FIG. 11 shows an example of an asymmetric CAZAC sequence set. Referring to FIG. 11, each sequence within a CAZAC sequence set has a different cyclic shifting (0, 3, 8, or 11), and the interval of cyclic shiftings between sequences is not the same (3 and 5). In this case, sequences having a small difference between cyclic shiftings may be grouped into a single group. That is, in FIG. 11, sequences having cyclic shiftings of 0 and 3 are grouped into a group A, and sequences having cyclic shiftings of 8 and 11 are grouped into a group B. Furthermore, in each group, bits may be mapped to each sequence so that the first bits are the same and the second bits are different. In FIG. 11, [0] is mapped to the sequences of the group A as the first bit, and [1] is mapped to the sequences of the group B as the first bit. As a result, in FIG. 11, [0 0] is mapped to a sequence having a cyclic shifting of 0, [0 1] is mapped to a sequence having a cyclic shifting of 3, [1 1] is mapped to a sequence having a cyclic shifting of 8, and [1 0] is mapped to a sequence having a cyclic shifting of 11, respectively.

If an asymmetric CAZAC sequence set is configured as described above, the interval of cyclic shifts between sequences within each group is 3, whereas the interval of cyclic shifts between groups is 5. In this case, a probability that a sequence having a cyclic shifting of 3 may be mistaken for a sequence having a cyclic shifting of 0 is higher than a probability that it may be mistaken for a sequence having a cyclic shifting of 8. That is, a probability that an error may occur in the first bit shared within a group is smaller than a probability that an error may occur in the second bit not shared within a group. Accordingly, information having higher importance may be mapped to the first bit, and information having relatively lower importance may be mapped to the second bit.

As a result, the asymmetric CAZAC sequence set is generated by making different the interval of cyclic shifts between sequences. Accordingly, a mistaken probability within a group may be different from a mistaken probability between groups. Information having different importance, that is, different QoS, is mapped based on a mistaken probability within a group and between groups, and thus a multi-QoS sequence may be finally transmitted.

The following information is an example of information having high importance.

A packet ID: a UE reads a packet ID and determines whether a currently received packet is its own packet. If the received packet is not its own packet, the UE no longer decode the packet and may reduce power by discarding the received packet. That is, if a packet ID is erroneously determined, a system yield may be greatly reduced because the packet itself is lost. Accordingly, a packet ID may be taken as information having high importance.

A basic service set ID (BSSID) of a Wi-Fi system: In the next-generation Wi-Fi system, a dense environment including many BSSs may be supported. In this case, when a UE reads a BSSID and recognizes that the transmission of a packet is generated within its own BSS, the UE may delay the transmission of its own packet although a channel is determined to be idle. The reason for this is that if its own packet is transmitted, decoding may be difficult due to a collision problem because an AP, that is, a recipient, has to receive a plurality of packets. Accordingly, a BSSID may be taken into consideration as information having high importance.

Bandwidth information: For example, if information of 2 bits is mapped to each sequence within a CAZAC sequence set as in the aforementioned embodiment, bandwidth information of 20 MHz, 40 MHz, 80 MHz, or 160 MHz may be mapped.

For example, information having low importance may include the number of Tx antennas or the location of an enhanced PDCCH (ePDCCH). In general, this information may be detected using a blind decoding method. However, blind decoding needs to be performed several times, and this may increase the latency and complexity of a system. If this information is transmitted through a signaling method, the disadvantages may be reduced or obviated. Furthermore, if information transmitted through a signaling method is not matched, it may be detected again using an existing blind decoding method. That is, since an error can be restored, an influence attributable to a failure in the transfer of the information is relatively small. As a result, information that may be restored may be classified as information having low importance.

Figure 12:
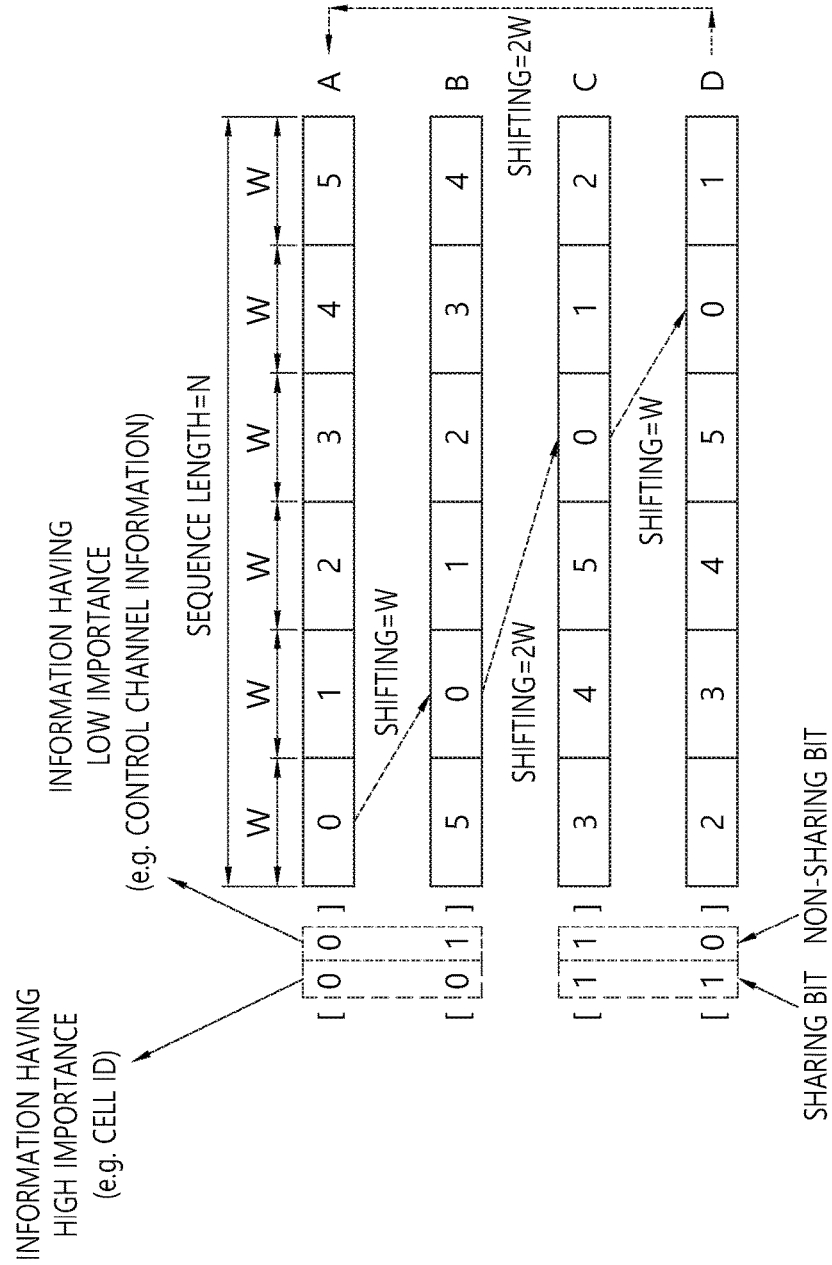
FIG. 12 shows another example of an asymmetric CAZAC sequence set.

FIG. 12 shows another example of an asymmetric CAZAC sequence set. Referring to FIG. 12, four sequences A, B, C, and D each having a length of N=6 W form an asymmetric CAZAC sequence set. The sequences A/B form a single group, and the sequences C/D form another group. The interval of cyclic shifts within each group is W, and the interval of cyclic shifts between the group is 2 W. In this case, it may be seen that a probability that a sequence may be mistaken for one of two neighbor sequences is different. For example, a probability that a sequence B may be mistaken for a sequence A is greater than a probability that the sequence B may be mistaken for a sequence C. Accordingly, bits may be mapped to each sequence so that sequences within a group having a small interval between cyclic shifts share a specific bit. In FIG. 12, the first bit mapped to a sequence becomes a shared bit within each group, and the second bit becomes a bit not shared within each group. [0] is mapped to the sequences A/B as the first bit, and [1] is mapped to the sequences C/D as the first bit. Furthermore, information having high importance may be mapped to a bit shared within a group, and information having low importance may be mapped to a bit not shared within a group. For example, a cell ID having high importance may be mapped to a bit shared within a group, and control channel information having low importance may be mapped to a bit not shared within a group.

An RACH preamble sequence may be designed as below by using the multi-QoS sequence. First, the RACH preamble sequence may be generated such that the cyclic shift $N_{cs}$ between the sequences in the same sequence group are the same and the cyclic shift offset between different sequence groups are different from each other by a predetermined value. More specifically, a first sequence group may be generated such that the cyclic shift between the sequences becomes the $N_{CS}$. In this case, the ZC sequence used for generating the RACH preamble sequence in the related art may be applied as it is. In addition, a cyclic shift offset $N_{off,g}$ between the sequence groups may be set. g as a group index has a value and $N_G$ represents the number of all sequence groups.

Figure 13:
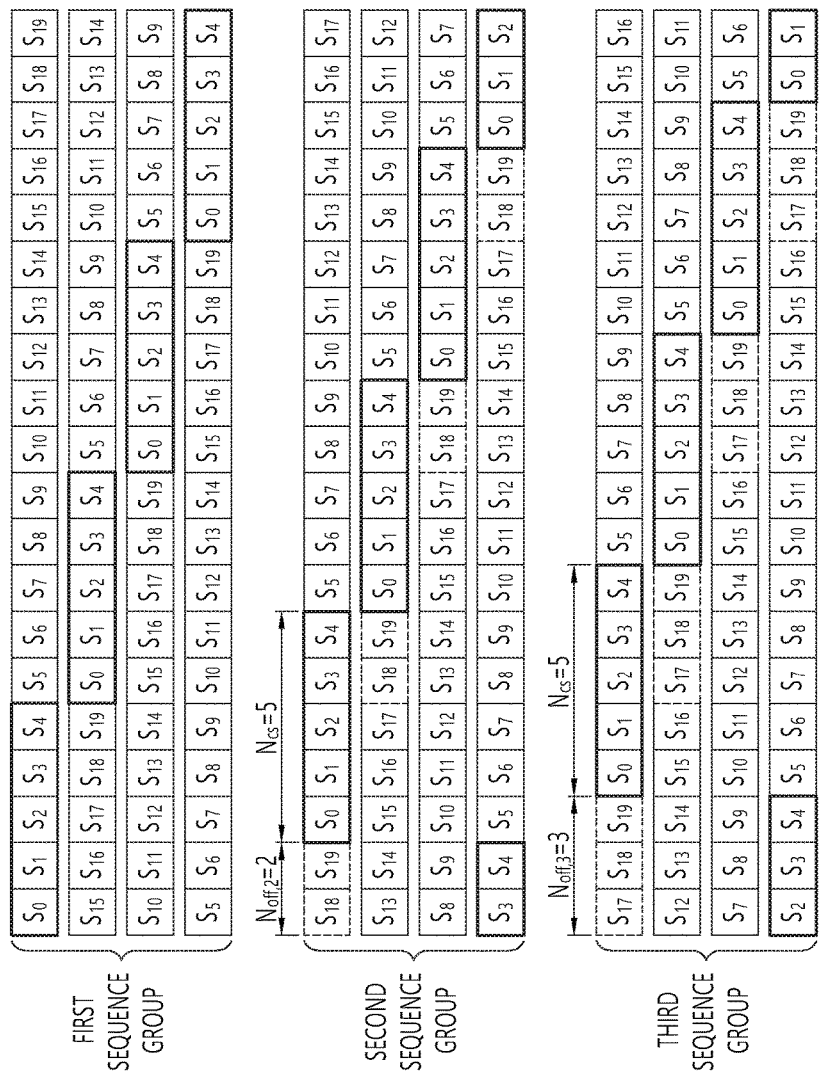
FIG. 13 illustrates one example of an RACH preamble sequence using a characteristic of a multi-OoS sequence.

FIG. 13 illustrates one example of an RACH preamble sequence using a characteristic of a multi-OoS sequence. In FIG. 13, it is assumed that the length of the sequence, $N_{ZC}$ is 20 and the number of sequence groups is 3. First, the first sequence group may be generated such that the cyclic shift between the sequences becomes the $N_{CS}$. In this case, the first sequence group may be generated to have the same characteristic as the RACH preamble sequence in the related art. In FIG. 13, it is assumed that $N_{CS}=5$. In addition, a second sequence group is the same as the first sequence group in that the cyclic shift between the sequences in the group, $N_{CS}=5$, but, the cyclic shift offset $N_{off,2}$ may be set such that the sequence is additionally cyclically shifted as a whole. In FIG. 13, it is assumed that $N_{off,2}=2$. Similarly, a third sequence group is the same as the first sequence group in that the cyclic shift between the sequences in the group, $N_{CS}=5$, but, the cyclic shift offset $N_{off,3}$ may be set such that the sequence is additionally cyclically shifted as a whole. In FIG. 13, it is assumed that $N_{off,3}=3$.

The cyclic shift offset between the sequence group, $N_{off,g}$ may be adaptively set or changed. Further, basically, it may be assumed that the cyclic shift offset of the first sequence group, $N_{off,1}=0$. Meanwhile, a zero-correlation zone means a region where a receiver output is observed in consideration of a channel delay of the RACH preamble transmitted by the UE. Therefore, it is possible to prevent ambiguity of sequence detection only when a relationship of max $(N_{off,g})+W_D<N_{CS}$ between the cyclic shift offset between the sequence groups and a channel delay window $W_D$. It is assumed that there is no round trip delay.

Figure 14:
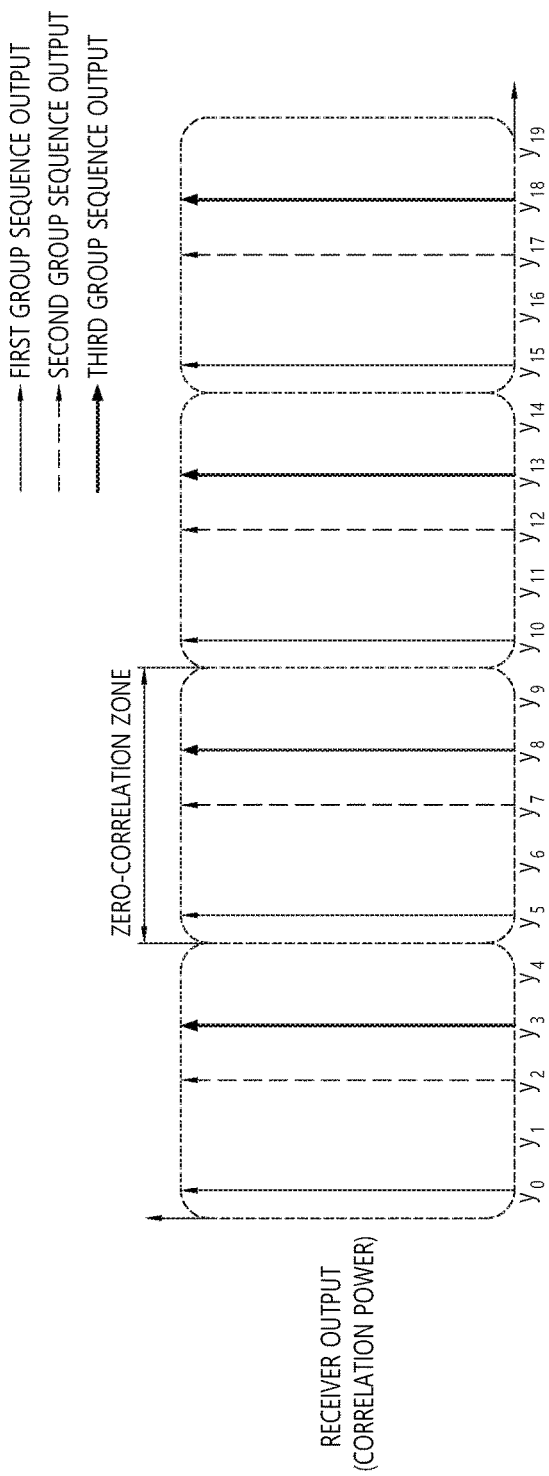
FIG. 14 illustrates detection of the RACH preamble sequence using the characteristic of the multi-OoS sequence.

FIG. 14 illustrates detection of the RACH preamble sequence using the characteristic of the multi-OoS sequence. When the UE transmits all sequences of the first, second, and third sequence groups described in FIG. 13 and an ideal communication environment without the channel delay is assumed, the eNB may obtain correlation based peak power illustrated in FIG. 14.

The characteristic of the multi-QoS sequence is applied to the RACH preamble sequence of 3GPP LTE/LTE-A as described below. In the LTE/LTE-A in the related art, the ZC sequence of a root index u may be defined by Equation 1.

$$x_u(n) = e^{-j\frac{\pi u n(n+1)}{N_{ZC}}}, 0 \leq n \leq N_{ZC} - 1 \qquad \langle \text{Equation 1} \rangle$$

In Equation 1, $N_{ZC}$ represents the length of the ZC sequence. In this case, the RACH preamble sequence having the zero-correlation zone $N_{CS}$ may be expressed by Equation 2.

$$x_{u,v}(n) = x_u((n+C_v) \bmod N_{ZC}) \qquad \langle \text{Equation 2} \rangle$$

In Equation 2, a cyclic shift $C_v$ may be given as Equation 3.

$$C_v = \begin{cases} vN_{CS} & v = 0, 1, \ldots, & \text{for unrestricted sets} \\ & \lfloor N_{ZC}/N_{cs} \rfloor - 1, N_{cs} \neq 0 \\ 0 & N_{CS} = 0 & \text{for unrestricted sets} \\ d_{start} \lfloor v/n_{shift}^{RA} \rfloor + & v = 0, 1, \ldots, & \text{for restricted sets} \\ (v \bmod n_{shift}^{RA}) N_{CS} & \eta_{shift}^{RA} n_{group}^{RA} + \bar{n}_{SHIFT}^{RA} - 1 \end{cases}$$ ⟨Equation 3⟩

The characteristic of the multi-QoS sequence is applied to the cyclic shift $C_v$ of the RACH preamble sequence of Equation 3 as described below. When unrestricted sets are described as an example in Equation 3, the cyclic shift of the first sequence group is the same as $vN_{CS}$ as shown in Equation 3, but the cyclic shift of the second sequence group may defined by Equation 4 and the cyclic shift of the third sequence group may be defined by Equation 5.

$C_v = vN_{CS} + N_{off,2}$ $v = 0, 1, \ldots, \lfloor N_{ZC}/N_{CS} \rfloor - 1$  <Equation 4>

$C_v = vN_{CS} + N_{off,3}$ $v = 0, 1, \ldots, \lfloor N_{ZC}/N_{CS} \rfloor - 1$  <Equation 5>

Referring to Equation 4, it can be seen that $N_{off,2}$ which is the cyclic shift offset of the second sequence group is added to the cyclic shift of the second sequence group. Further, referring to Equation 5, it can be seen that $N_{off,3}$ which is the cyclic shift offset of the third sequence group is added to the cyclic shift of the third sequence group.

A method for transmitting the RACH preamble generated based on a sequence (hereinafter, a combination sequence) configured by the multi-QoS sequence or a specific combination of sequences which belong to different sequence groups is described below. First, the sequence of each sequence group may be expressed by Equation 6. In Equation 1, $s_i(j)$ represents an i-th sequence (i=0, 1, 2, . . . ) of a j-th group (j=1, 2, 3, . . . ).

$s_0^{(1)} = [s_0, s_1, \ldots, s_{N_{ZC}-1}]^T$  ⟨Equation 6⟩

$s_1^{(1)} = [s_{N_{ZC}-N_{CS}}, s_{N_{ZC}-N_{CS}+1}, \ldots, s_{N_{ZC}-N_{CS}-1}]^T$ $s_2^{(1)} = [s_{N_{ZC}-2 \cdot N_{CS}}, s_{N_{ZC}-2 \cdot N_{CS}+1}, \ldots, s_{N_{ZC}-2 \cdot N_{CS}-1}]^T$

⋮

$s_0^{(2)} = [s_{N_{off,2}}, s_{N_{off,2}+1}, \ldots, s_{N_{off,2}+N_{ZC}-1}]^T$ $s_1^{(2)} = [s_{N_{off,2}+N_{ZC}-N_{CS}}, s_{N_{off,2}+N_{ZC}-N_{CS}+1}, \ldots,$ $s_{N_{off,2}+N_{ZC}-N_{CS}-1}]^T$ $s_2^{(2)} = [s_{N_{off,2}+N_{ZC}-2 \cdot N_{CS}}, s_{N_{off,2}+N_{ZC}-2 \cdot N_{CS}+1}, \ldots,$ $s_{N_{off,2}+N_{ZC}-2 \cdot N_{CS}-1}]^T$

⋮

$s_0^{(3)} = [s_{N_{off,3}}, s_{N_{off,3}+1}, \ldots, s_{N_{off,3}+N_{ZC}-1}]^T$ $s_1^{(3)} = [s_{N_{off,3}+N_{ZC}-N_{CS}}, s_{N_{off,3}+N_{ZC}-N_{CS}+1}, \ldots,$ $s_{N_{off,3}+N_{ZC}-N_{CS}-1}]^T$ $s_2^{(3)} = [s_{N_{off,3}+N_{ZC}-2 \cdot N_{CS}}, s_{N_{off,3}+N_{ZC}-2 \cdot N_{CS}+1}, \ldots,$ $s_{N_{off,3}+N_{ZC}-2 \cdot N_{CS}-1}]^T$

⋮

$s_0^{(N_G)} = [s_{N_{off,N_G}}, s_{N_{off,N_G}+1}, \ldots, s_{N_{off,N_G}+N_{ZC}-1}]^T$ $s_1^{(N_G)} = [s_{N_{off,N_G}+N_{ZC}-N_{CS}}, s_{N_{off,N_G}+N_{ZC}-N_{CS}+1}, \ldots,$ $s_{N_{off,N_G}+N_{ZC}-N_{CS}-1}]^T$ $s_2^{(N_G)} = [s_{N_{off,N_G}+N_{ZC}-2 \cdot N_{CS}}, s_{N_{off,N_G}+N_{ZC}-2 \cdot N_{CS}+1}, \ldots,$ $s_{N_{off,N_G}+N_{ZC}-2 \cdot N_{CS}-1}]^T$

⋮

The multi-QoS sequence may be generated by Equation 7 based on the sequence of each sequence group expressed in Equation 6.

$s = \alpha_1 s_i^{(1)} + \alpha_2 s_i^{(2)} + \alpha_3 s_i^{(3)} + \ldots + \alpha_{N_G} s_i^{(N_G)}$  <Equation 7>

Referring to Equation 7, the multi-QoS sequence is calculated by granting a weight $\alpha_j$ to the same i-th sequence of the respective sequence groups and adding up the sequences granted with the weight $\alpha_j$. For example, when it is assumed that the first sequence of the first group is $s_0^{(1)} = [s_0, s_1, s_2, s_3, \ldots, s_{19}]^T$ and the first sequence of the second sequence group is $s_0^{(2)} = [s_{18}, s_{19}, s_0, s_1, \ldots, s_{17}]^T$, and the weight of each sequence, $\alpha_1 = \alpha_2 = 1$, the multi-QoS sequence which the UE finally transmits the UE may be generated as shown in Equation 8.

$$s = s_0^{(1)} + s_0^{(2)}$$ ⟨Equation 8⟩
$$= [s_0 + s_{18}, s_1 + s_{19}, s_2 + s_0, s_3 + s_1, \ldots, s_{19} + s_{17}]^T$$

The following procedure may just follow an RACH preamble transmission procedure in the related art.

In the random access procedure of the collision of the RACH preamble is described.

Figure 15:
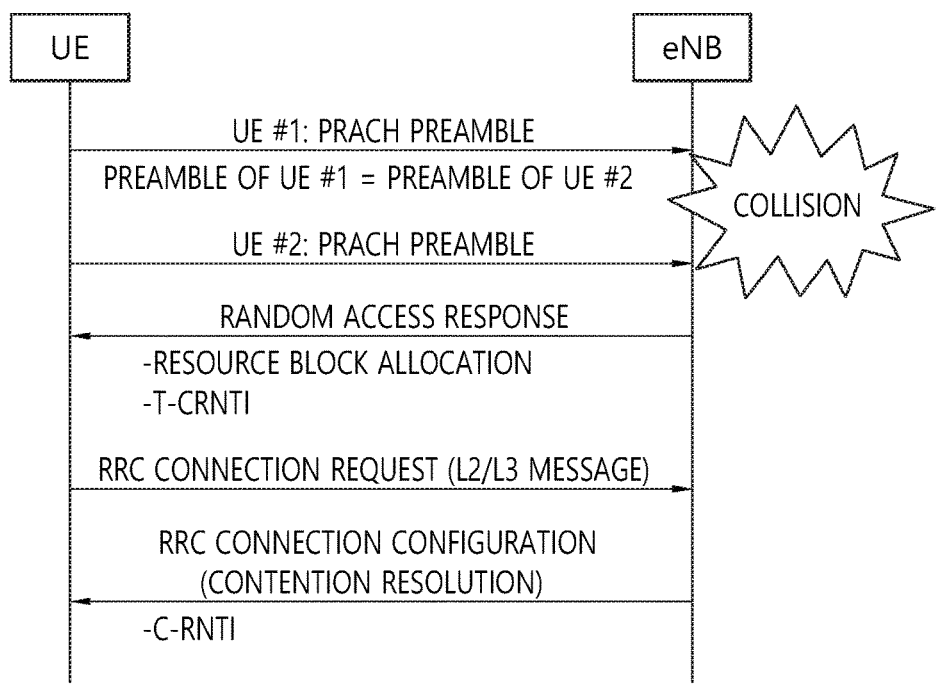
FIG. 15 illustrates one example in which the RACH preambles collide in a contention based random access procedure.

FIG. 15 illustrates one example in which the RACH preambles collide in a contention based random access procedure. All UEs may use the contention based random access procedure described in FIG. 6 in order to obtain UL synchronization and transmit the RACH preamble by using a specific time-frequency resource. In this case, when two or more RACH preambles are transmitted from a plurality of UEs through the same time-frequency resource, the collision occurs in the case where the eNB detects the RACH preamble, the random access procedure of each UE may be restarted. That is, when the RACH preamble of UE #0 and the RACH preamble of UE #1 are transmitted through the same time-frequency resource, the RACH preambles collide with each other.

When the eNB may not recognize the collision at the time of detecting the RACH preamble, an actual collision occurs, the eNB may not know the actual collision. In this case, all UEs in which the RACH preambles collide with each other may receive the random access response and all of the UEs in which the collision occurs may transmit the RRC connection request message to the eNB. The eNB that receives the RRC connection request message from the UE in which the collision occurs may recognize the collision of the RACH preamble and restart the random access procedure. When the eNB may recognize the collision at the time of detecting the RACH preamble, the corresponding UE may not receive the random access response to the RACH preamble.

Meanwhile, the eNB that receives the RACH preamble may transmit the random access response after 3 ms. However, a size of ra-ResponseWindowSize of RACH-Config-Common information element (IE) is set to 2 to 10 ms. Therefore, a difference of a maximum of 12 ms may occurs between reception of the RACH preamble and transmission of the random access response. Consequently, the UE may recognize whether the RACH preambles collide with each other after a maximum of 12 ms and retransmits the RACH preamble after waiting for receiving the random access response for a maximum of 12 ms. When UE #0 and UE #1 that retransmit the RACH preamble due to the collision of the RACH preambles use the same RACH preamble again, the collision may occur again.

Figure 16:
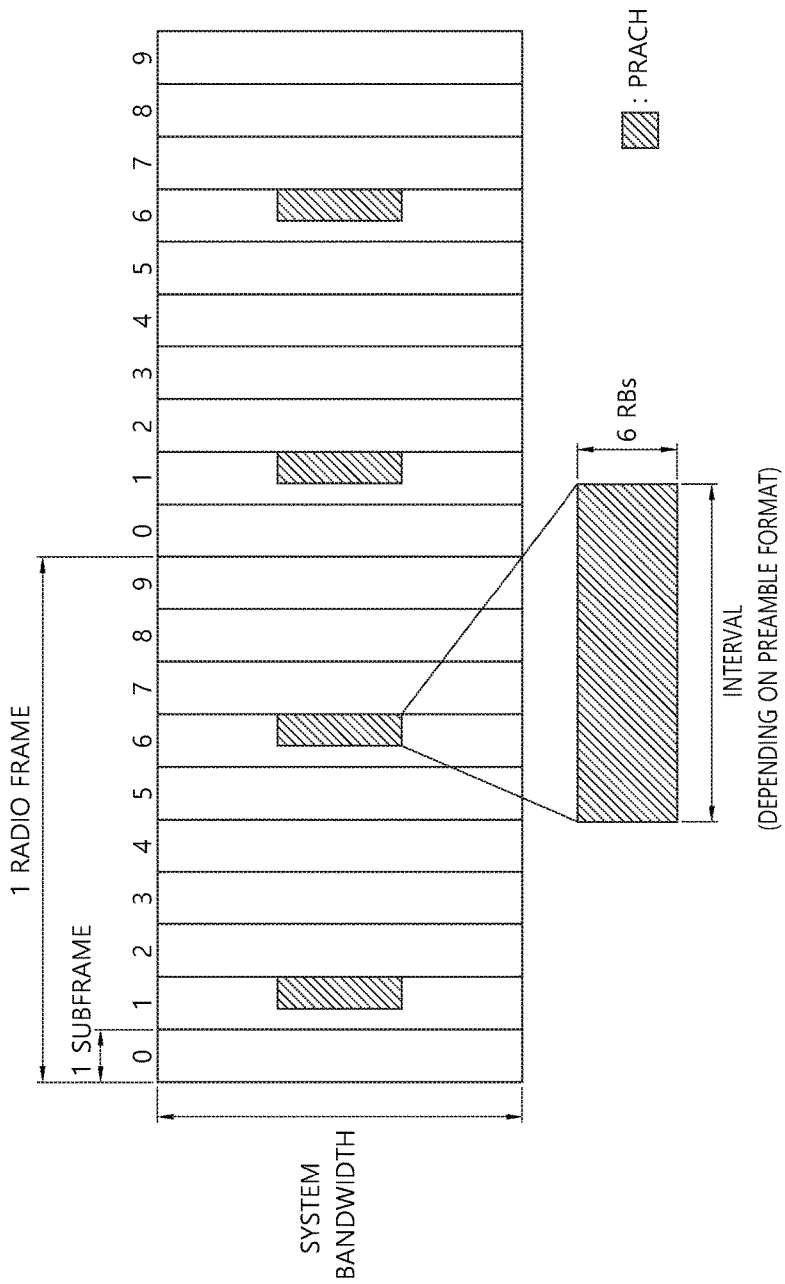
FIG. 16 illustrates a time-frequency resource in which the RACH preamble is transmitted.

FIG. 16 illustrates a time-frequency resource in which the RACH preamble is transmitted. In FIG. 16, it is assumed that a PRACH resource depending on PRACH configuration index 6 is configured in frame structure type 1, that is, an FDD frame. A region checked in FIG. 16 is a PRACH resource region, that is, a region where the UE maps and transmits the sequence for the RACH preamble. When UE #0 and UE #1 select the same preamble sequence and transmit the RACH preamble by selecting the same PRACH resource region, the RACH preambles collide with each other.

Figure 17:
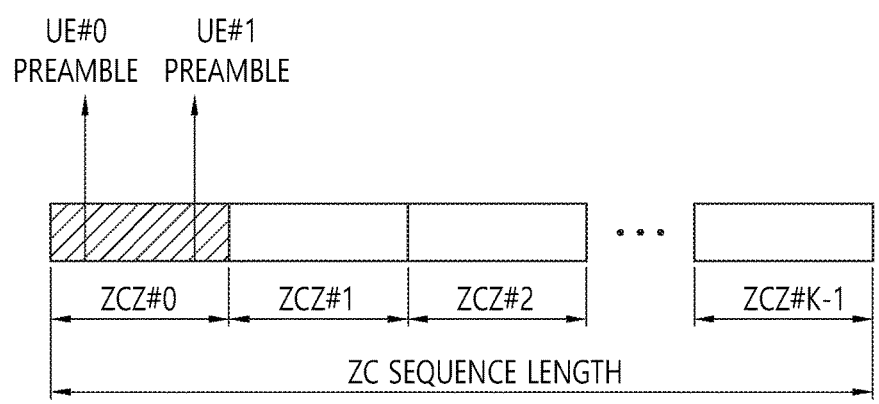
FIG. 17 illustrates one example of the collision of the RACH preamble.

FIG. 17 illustrates one example of the collision of the RACH preamble. Referring to FIG. 17, two correlation peaks are detected in one ZCZ. Therefore, the eNB recognizes the collision by assuming that two or more UEs select the same RACH preamble.

Hereinafter, the collision of the RACH preambles which the plurality of UEs transmits in an environment in which a channel delay occurs due to multiple paths will be described.

Figure 18:
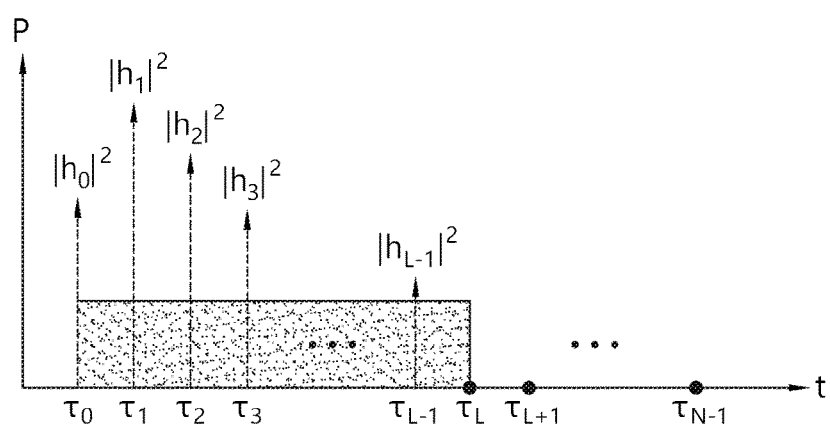
FIG. 18 illustrates one example of a channel having the channel delay by the multiple paths.

FIG. 18 illustrates one example of a channel having the channel delay by the multiple paths. In general, in a wireless channel, the multi-path channel delay may occur due to multiple scatters on the periphery of the channel. Referring to FIG. 18, a characteristic of the channel without the channel delay is shown as $h_0$ at time $\tau_0$. However, the channel delay occurs due to the multiple paths and this is shown as $h_1$ at time $\tau_1$, as $h_2$ at time $\tau_2$, ..., as $h_{L-1}$ at time $\tau_{L-1}$ according to the respective paths.

The channel having the channel delay by the multiple paths of FIG. 18 may be expressed by Equation 9 as below.

$$h(t, \tau) = \sum_{d=0}^{N_L-1} h_d(t)\delta(\tau - \tau_d) \quad \text{(Equation 9)}$$

In Equation 9, $h_d(t)$ represents a coefficient of the channel, which is changed according to the time and $N_L$ represents the number of taps of the delay channel. In this case, when a sequence x(n) is transmitted, a finally received signal may be expressed by Equation 10.

$$y(n) = \sum_{d=0}^{N_L-1} h_d(n)x(n - \tau_d) \quad \text{(Equation 10)}$$

In Equation 10, $h_d(n)$ represents a channel coefficient of a d-th delay channel tap and $x(n-\tau_d)$ represents a transmission sequence by a time delay $\tau_d$ of the d-th delay channel tap.

Therefore, when it is assumed that two different UEs transmit the same RACH preamble and a time delay $\tau_d'$ by a distance between two UEs occurs, the signal which the eNB finally receives may be expressed by Equation 11.

$$y(n) = \sum_{d=0}^{N_L-1} h_d^A(n)x(n - \tau_d) + \sum_{d=0}^{N_L-1} h_d^B(n)x(n - \tau_d - \tau'_d) \quad \text{(Equation 11)}$$

In this case, first, a case where there is no channel delay by the multiple paths is assumed. That is, the number of delays by the channel tap, $N_L$ is 1 (average power is 1). Further, it is assumed that the channel coefficient $h_d(n)$ is a Rayleigh fading channel, the sequence length $N_{ZC}$ is 839, and the time delay by a distance between UE #A and UE #B, $\tau_d'$ is 50.

Figure 19:
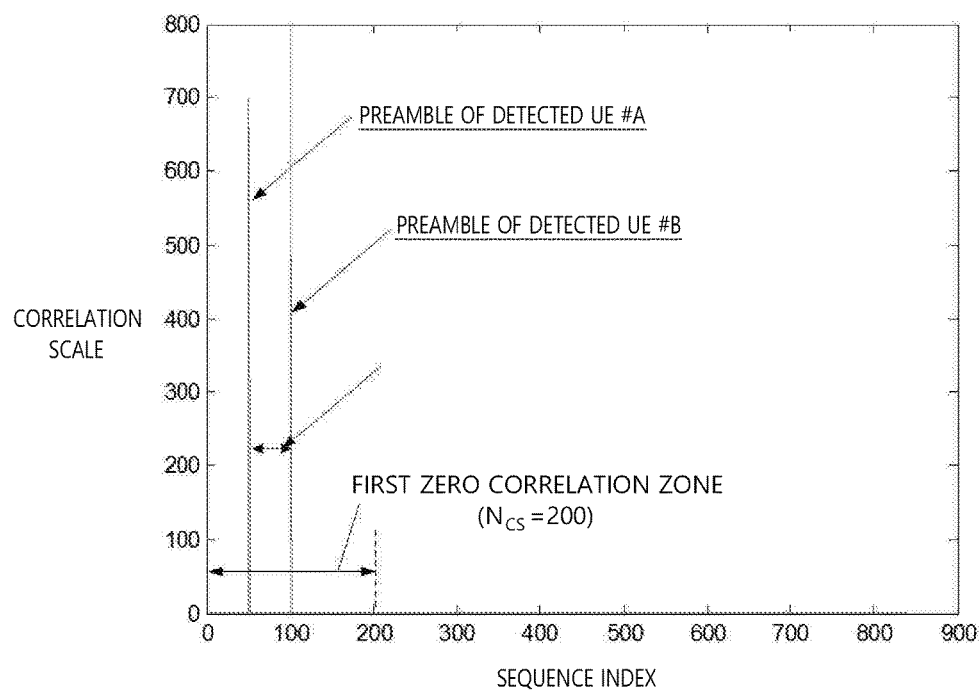
FIG. 19 illustrates one example of a case where the eNB detects the collision of the RACH preambles when there is no channel delay by the multiple paths.

FIG. 19 illustrates one example of a case where the eNB detects the collision of the RACH preambles when there is no channel delay by the multiple paths. Referring to FIG. 19, it can be seen that the RACH preambles of UE #A and UE #B are clearly distinguished and detected in a given ZCZ. Therefore, the eNB may detect the collision of the RACH preamble of UE #A and the RACH preamble of UE #B. As a result, the eNB may perform an RACH preamble retransmission procedure immediately without transmitting an RAR message to the UEs.

Next, a case where there is the channel delay by the multiple paths is assumed. It is assumed that the number of delays by the channel tap, $N_L$ is 50 (the average power is 1). Further, it is assumed that the channel coefficient $h_d(n)$ is the Rayleigh fading channel, the sequence length $N_{zc}$ is 839, and the time delay by the distance between UE #A and UE #B, $\tau_d'$ is 50.

Figure 20:
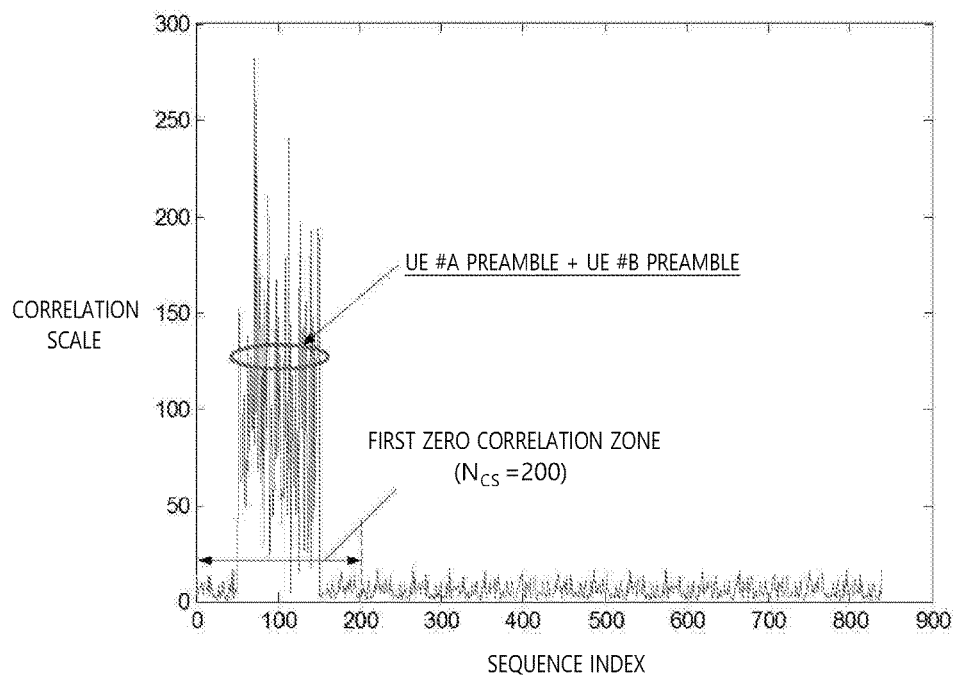
FIG. 20 illustrates one example of a case where the eNB is not capable of detecting the collision of the RACH preambles when there is the channel delay by the multiple paths.

FIG. 20 illustrates one example of a case where the eNB is not capable of detecting the collision of the RACH preambles when there is the channel delay by the multiple paths. Referring to FIG. 20, it can be seen that the RACH preambles of UE #A and UE #B are not clearly distinguished and detected in the given ZCZ. The reason is that autocorrelation locations of the RACH preamble transmitted by UE #A and the RACH preamble transmitted by UE #B in the given ZCZ overlap with each other by the channel delay by the multiple paths. Therefore, the eNB may not detect the collision of the RACH preamble of UE #A and the RACH preamble of UE #B.

Figure 21:
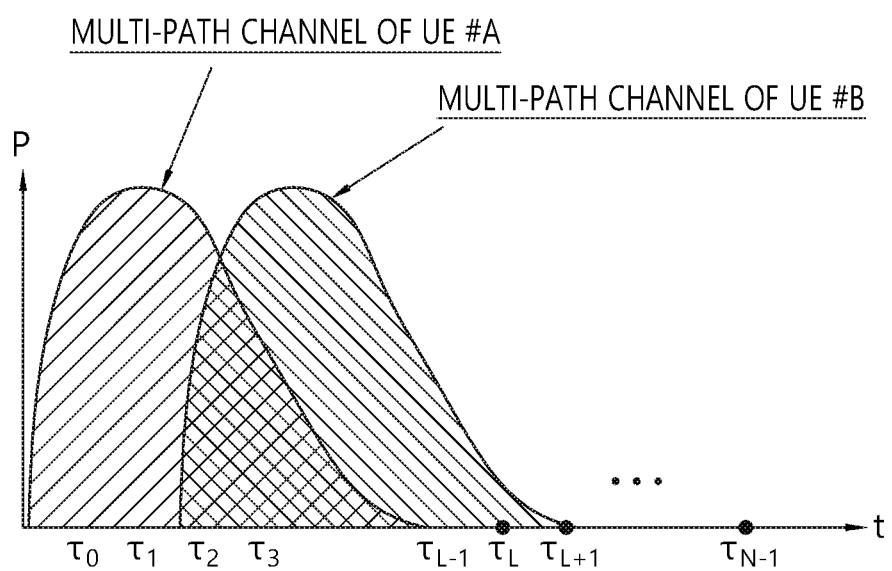
FIG. 21 illustrates one example of a case where received signals overlap with each other by a multi-path channel.

FIG. 21 illustrates one example of a case where received signals overlap with each other by a multi-path channel. Referring to FIG. 21, since overlapped signals are generated at a specific time by the channel delay between UE #A and UE #B, a pattern of the finally received signal shown by a channel experienced by each UE is not distinguished but ambiguous.

When the above descriptions are combined, in the case where two or more UEs transmit the same RACH preamble constituted by a single sequence, it is impossible for the eNB to detect the collision of the RACH preambles by the channel delay by the multiple paths. The eNB assumes that the RACH preamble is once detected when a magnitude of received power exceeds a reference value. Therefore, the eNB cannot but transmit the RAR message to both UE #A and UE #B. Thereafter, the eNB receives and detects the RRC connection request messages from UE #A and UE #B and then only recognizes the collision of the RACH preambles of UE #A and UE #B and performs the RACH preamble retransmission procedure. During such an unnecessary procedure, a time delay of a maximum 12 ms+5 ms—a round trip delay (RTD) may occur in the 3GPP LTE. As a result, a serious service delay may occur in UE which urgently requests obtaining the UL synchronization.

In order to solve the problem in the related art, the present invention a method for detecting the collision of the RACH preambles in the channel delay environment by the multiple paths. According to an embodiment of the present invention, a new RACH preamble may be designed by adopting a design principle of the multi-QoS sequence so that the eNB more rapidly detects the collision of the RACH preambles in the channel delay environment by the multiple paths. Therefore, the eNB may rapidly perform a follow-up action by immediately recognizing the collision of the RACH preambles of the UEs in the channel delay environment by the multiple paths. In the following description, the multi-QoS sequence or a combination sequence may be mixedly used.

First, according to an embodiment of the present invention, a method is described, in which the eNB detects whether the RACH preambles transmitted by the plurality of UEs collide with each other by comparing received patterns at the time of the RACH preambles using the combination sequence. That is, the eNB may detect whether the RACH preambles transmitted by the plurality of UEs collide with each other by comparing patterns of received outputs having multiple peaks.

For example, it is assumed that UE #A transmits the RACH preamble constituted by the combination sequence and UE #B transmits a normal RACH preamble in the related art. The RACH preamble constituted by the combination sequence transmitted by UE #A may be generated based on Equation 7 described above. In this case, it is assumed that $N_{ZC}=839$, the cyclic shift length $N_{CS}=300$, the cyclic shift offset of the second sequence group, $N_{off;2}=100$, the cyclic shift offset of the third sequence group, $N_{off;3}=200$. Assuming that UE #A adds the fourth sequence of the first, second, and third sequence groups to generate a final RACH preamble, the RACH preamble transmitted by UE #A may be expressed by Equation 12.

$$s_A = \alpha_1 s_3^{(1)} + \alpha_2 s_3^{(2)} + \alpha_3 s_3^{(3)} \quad \langle \text{Equation 12} \rangle$$

$$\alpha_1 = \alpha_2 = \alpha_3 = \sqrt{\frac{1}{3}P}, (\alpha_1^2 + \alpha_2^2 + \alpha_3^2 = P)$$

In addition, the normal RACH preamble transmitted by UE #B may be generated based on Equations 1 to 3. Assuming that UE #B uses the fourth sequence as the RACH preamble, the RACH preamble transmitted by UE #B may be expressed by Equation 13.

$$s_B = s_3^{(1)} \quad \text{<Equation 13>}$$

Additionally, it is assumed that UE #B has the time delay $\tau_d'$ of 20 due to the distance from UE #A. In this case, the signal finally received by eNB may be expressed by Equation 14.

$$y(n) = \sum_{d=0}^{N_L-1} h_d^{(A)}(n)(s_3^{(1)}(n-\tau_d) + s_3^{(2)}(n-\tau_d) + s_3^{(3)}(n-\tau_d)) + \quad \langle \text{Equation 14} \rangle$$

-continued
$$\sum_{d=0}^{N_L-1} h_d^{(B)}(n) s_3^{(1)}(n-\tau_d-\tau'_d)$$

Figure 22:
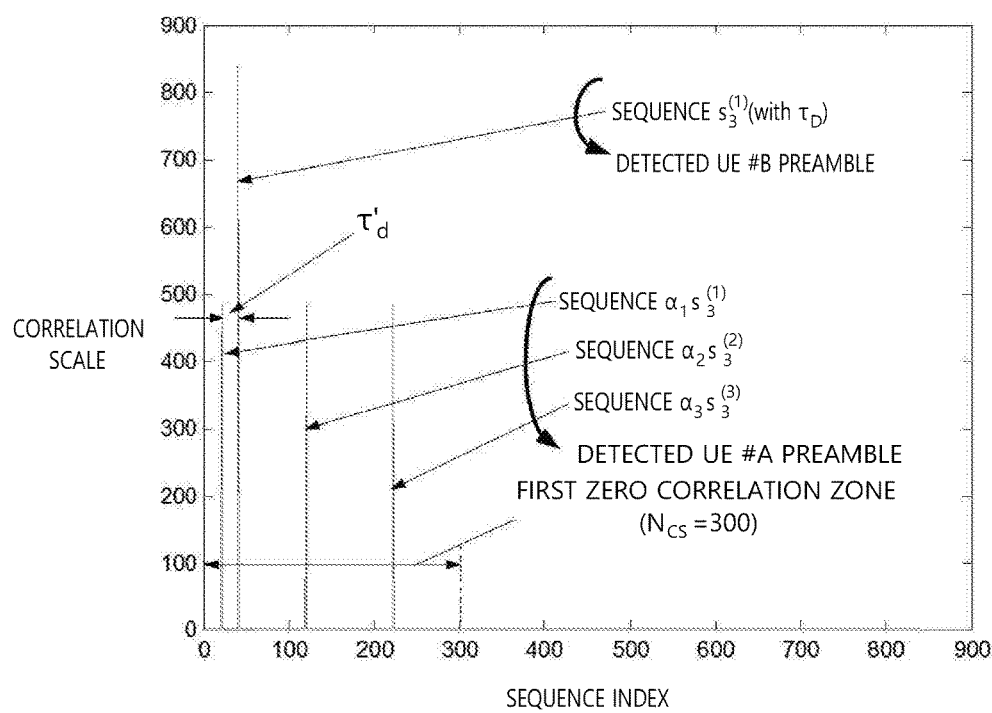
FIG. 22 illustrates one example of detecting the RACH preambles of UE #A and UE #B when there is no channel delay by the multiple paths.

FIG. 22 illustrates one example of detecting the RACH preambles of UE #A and UE #B when there is no channel delay by the multiple paths. FIG. 22 illustrates a state in which when there is no channel delay by the multiple paths in an additive white Gaussian noise (AWGN) environment (that is, the number of channel delay taps, NL=1), the RACH preamble constituted by the combination sequence transmitted by UE #A and the normal RACH preamble transmitted by UE #B are detected. Referring to FIG. 22, the RACH preamble of UE #A is detected 3 times by the combination sequence in a first ZCZ and the RACH preamble of UE #B is detected once with the time delay $\tau_d'$. That is, the channel delay occurs, but the RACH preamble transmitted by UE #A and the RACH preamble transmitted by UE #B are detected while being clearly distinguished from each other in a given ZCZ.

Figure 23:
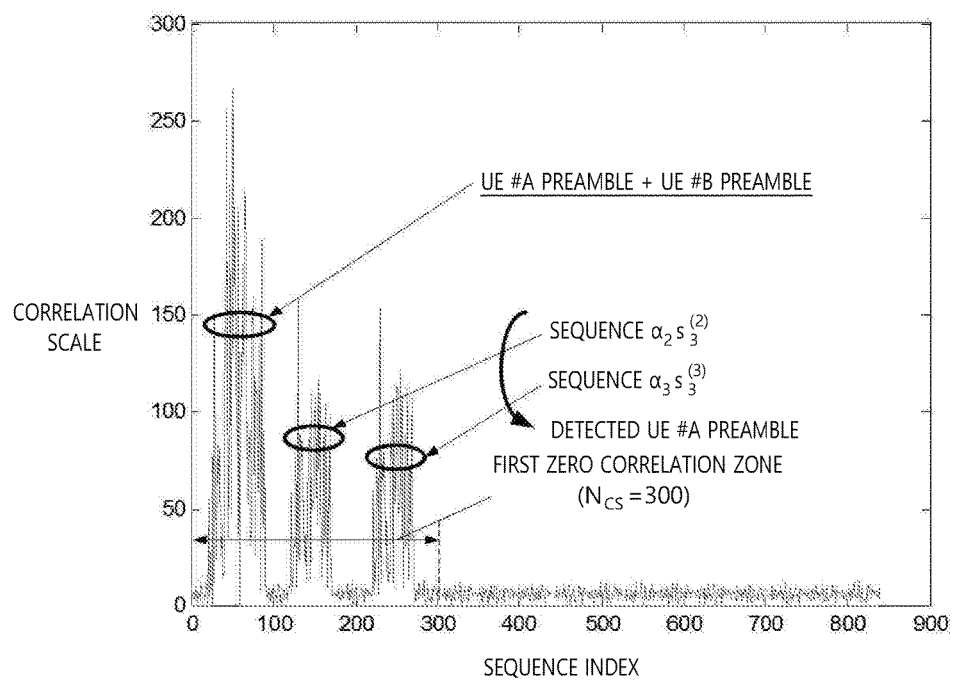
FIG. 23 illustrates one example of detecting the RACH preambles of UE #A and UE #B when there is the channel delay by the multiple paths according to the embodiment of the present invention.

FIG. 23 illustrates one example of detecting the RACH preambles of UE #A and UE #B when there is the channel delay by the multiple paths according to the embodiment of the present invention. FIG. 23 illustrates a state in which when there is the channel delay by the multiple paths in a Rayleigh fading channel environment, the RACH preamble constituted by the combination sequence transmitted by UE #A and the normal RACH preamble transmitted by UE #B are detected. It is assumed that the number of channel delay taps, $N_L=50$. Referring to FIG. 23, the RACH preamble of the UE #B is detected together in a region where a first sequence $\alpha_1 s_3^{(1)}$ constituting the RACH preamble of the UE #A is detected. Since the eNB may not know the multiple paths generated by the corresponding wireless channel, the eNB may not detect the collision of the RACH preamble of UE #A and the RACH preamble of UE #B. However, since the second sequence and the third sequence constituting the RACH preamble of UE #A are additionally detected, the eNB may know that the RACH preamble of UE #A and the RACH preamble of UE #B collide with each other in the area of the first sequence.

In detail, the eNB may compare a correlation of the sequence constituting the RACH preamble of UE #A in order to detect whether the RACH preambles collide with each other. That is, an output of a receiver is compared and if output patterns do not match each other, it can be seen that the RACH preamble of UE #A and the RACH preamble of UE #B collide with each other. In FIG. 23, the collision of the RACH preambles may be known by comparing the regions of the second and third sequences constituting the RACH preamble of UE #A and the first sequence with each other.

Alternatively, the eNB may compare a power ratio of the sequences constituting the RACH preamble of UE #A in order to detect whether the RACH preambles collide with each other. When signals of specific UEs overlap with each other, a power magnitude of a received signal is changed in the corresponding region. In general, the power magnitude of the received signal is changed in a pattern in which the power magnitude increases. For example, assuming that the time delay by the distance between the UE #A and the UE #B, $\tau_d'=0$, the received signal may be expressed by Equation 15 in Equation 14.

$$y(n) = \sum_{d=0}^{N_L-1} h_d^{(A)}(n)(s_3^{(1)}(n-\tau_d) + s_3^{(2)}(n-\tau_d) + s_3^{(3)}(n-\tau_d)) + \quad \langle \text{Equation 15}\rangle$$

$$\sum_{d=0}^{N_L-1} h_d^{(B)}(n)s_3^{(1)}(n-\tau_d - \tau'_d)$$

$$y(n) = \sum_{d=0}^{N_L-1} (h_d^{(A)}(n) + h_d^{(B)}(n))s_3^{(1)}(n-\tau_d) +$$

$$\downarrow$$

$$\sum_{d=0}^{N_L-1} h_d^{(A)}(s_3^{(2)}(n-\tau_d) + s_3^{(3)}(n-\tau_d))$$

In Equation 15, the channels experienced by UE #A and UE #B are expressed by a first term of a right side of Equation 15. Different sequences $s_3^{(2)}$ and $s_3^{(3)}$ are detected in different regions due to an orthogonal characteristic thereof. An expectation value of the first term of the right side of Equation 15 may be expressed by Equation 16.

$$(h_d^{(A)}(n) + h_d^{(B)}(n))s_3^{(1)}(n-\tau_d) \rightarrow \quad \langle \text{Equation 16}\rangle$$

$$E\{|(h_d^{(A)}(n) + h_d^{(B)}(n))s_3^{(1)}(n-\tau_d)|^2\} =$$

$$E\{|h_d^{(A)}(n)|^2 + |h_d^{(A)}(n)|^2 + 2(h_d^{(A)}(n) \cdot h_d^{(B)}(n))\} =$$

$$E\{|h_d^{(A)}(n)|^2\} + E\{|h_d^{(A)}(n)|^2\} + E\{2(h_d^{(A)}(n) \cdot h_d^{(B)}(n))\} =$$

$$\sigma_A^2 + \sigma_A^2 + 2E\{(h_d^{(A)}(n) \cdot h_d^{(B)}(n))\} = \sigma_A^2 + \sigma_A^2 + 2E$$

$$\{h_d^{(A)}(n)\}E\{h_d^{(B)}(n)\}(\because E\{h_d(n)\} = 0) = \sigma_A^2 + \sigma_A^2$$

Referring to Equation 16, when the powers of the channels are the same as 1, a received signal power of 2 is theoretically detected. That is, the value may vary according to the channel delay by the multiple paths, but a large received signal power is basically detected. Therefore, when a signal having a larger power than the second and third sequences constituting the RACH preamble is detected in the region of the first sequence, the eNB may know that the RACH preamble of UE #A and the RACH preamble of UE #B collide with each other. Referring to FIG. 23, it can be seen that when the received signal power of the detection region of $\alpha_1 s_3^{(1)}$ which is the first sequence constituting the RACH preamble of UE #A is larger than the received signal powers of $\alpha_2 s_3^{(2)}$ and $\alpha_3 s_3^{(3)}$ which are the second and third sequences constituting the RACH preamble of UE #A. Therefore, the eNB may know that the RACH preamble of UE #A and the RACH preamble of UE #B collide with each other by comparing the received signal powers.

Hereinafter, a method will be described, in which the eNB which detects whether the RACH preambles collide with each other by comparing the received patterns of the RACH preambles transmits the RAR message for only the UE that transmits the RACH preamble constituted by the combination sequence according to the embodiment of the present invention. The eNB needs to preferentially transmit the RAR message according to a service type corresponding to the RACH preamble constituted by the combination sequence. In this case, the service type corresponding to the RACH preamble constituted by the combination sequence may be a retransmitted RACH preamble or an RACH preamble of low delay request UE or UE which requests an emergent access. All RACH preambles correspond to a service that needs to rapidly obtain the UL synchronization.

For the UE that transmits the RACH preamble constituted by the combination sequence, the eNB may transmit the RAR message having the existing configuration based on a new RA-RNTI. As described above, the RACH preamble may include the RA-RNTI and may be determined as (1+t_id+10*f_id). The eNB may obtain the RA-RNTI by decoding the RACH preamble. The RA-RNTI obtained by the eNB may become a scrambling ID of the PDCCH and the UE obtains the RAR message transmitted through the PDSCH scheduled by the PDCCH scrambled with the corresponding RA-RNTI to transmit the RRC connection request message to the eNB. According to the embodiment of the present invention, the new RA-RNTI may be additionally defined for the UE that transmits the RACH preamble constituted by the combination sequence. That is, a total of 60 RA-RNTIs exist at present and the RA-RNTI may be additionally defined for the UE that transmits the RACH preamble constituted by the combination sequence. The eNB may transmit the RAR message through the PDSCH scheduled by the PDCCH scrambled with RA-RNTI which is additionally defined according to the embodiment of the present invention and the RAR message may be detected by only the UE that transmits the RACH preamble constituted by the combination sequence.

For the UE that transmits the RACH preamble constituted by the combination sequence, the newly defined RA-RNTI may be expressed by Equation 17.

$$\text{RA-RNTI} = (1 + t\_id + 10*f\_id + N_{offset}) \mod N_{RA} \quad \langle \text{Equation 17}\rangle$$

In Equation 17, $N_{offset}$ represents an offset for the UE that transmits the RACH preamble constituted by the combination sequence. $N_{offset}$ may be previously defined for each cell or for each UE. $N_{RA}$ represents the total number of RA-RNTIs.

Alternatively, for the UE that transmits the RACH preamble constituted by the combination sequence, the eNB may transmit an RAR message having a new configuration based on the RA-RNTI in the related art. When the RACH preambles transmitted by the plurality of UEs collide with each other and the RACH preamble constituted by the combination sequence among the RACH preambles is detected, the eNB may configure the RAR message so as to include a legacy random access preamble ID (RAPID) and a priority value field. That is, for the UE that transmits the RACH preamble constituted by the combination sequence, the eNB may transmit a new RAR message generated by additionally adding the priority value field to the RAR message in the related art. In this case, the priority value field indicates that the corresponding RAR message is the RAR message for the UE that transmits the RACH preamble constituted by the combination sequence. That is, the priority value field indicates that the corresponding RAR message an RAR message for UE that preferentially obtains the UL synchronization.

For example, the UE that transmits the RACH preamble of the same legacy RAPID may once receive all RAR messages. That is, when UE #A and UE #B transmit the RACH preamble having the same legacy RAPID, both UE #A and UE #B may once receive the RAR message including the corresponding legacy RAPID. However, only UE #A that transmits the RACH preamble constituted by the combination may confirm the legacy RAPID included in the RAR message and a newly added priority value field. UE #A that confirms the priority value field in the RAR message transmits the RRC connection request message to the eNB.

UE #B that transmits the existing RACH preamble retransmits the RACH preamble without transmitting the RRC connection request message.

Hereinafter, a method will be described, in which the eNB distinguishes a services of a UE that transmits the RACH preamble using a received output relative ratio of the RACH preamble constituted by the combination sequence and applies the random access procedure suitable for the service according to an embodiment of the present invention. That is, the reception output patterns of the RACH preambles are compared with each other by the method for detecting the collision of the RACH preambles, and as a result, when it is detected that the RACH preambles do not collide with each other, the eNB may distinguish and apply a UL synchronization obtaining procedure for the UE that transmits the RACH preamble constituted by the combination sequence by using a detection power ratio of the combination sequence constituting the RACH preamble. That is, the eNB may selectively apply the random access procedure depending on the service type of the UE according to the service type of the detected RACH preamble. For example, the UE that requests urgently obtaining the UL synchronization may transmit the RACH preamble constituted by the combination sequence having a specific power ratio to the eNB. Then, the eNB may perform the random access procedure without the delay by immediately transmitting the RAR message the corresponding UE.

Figure 24:
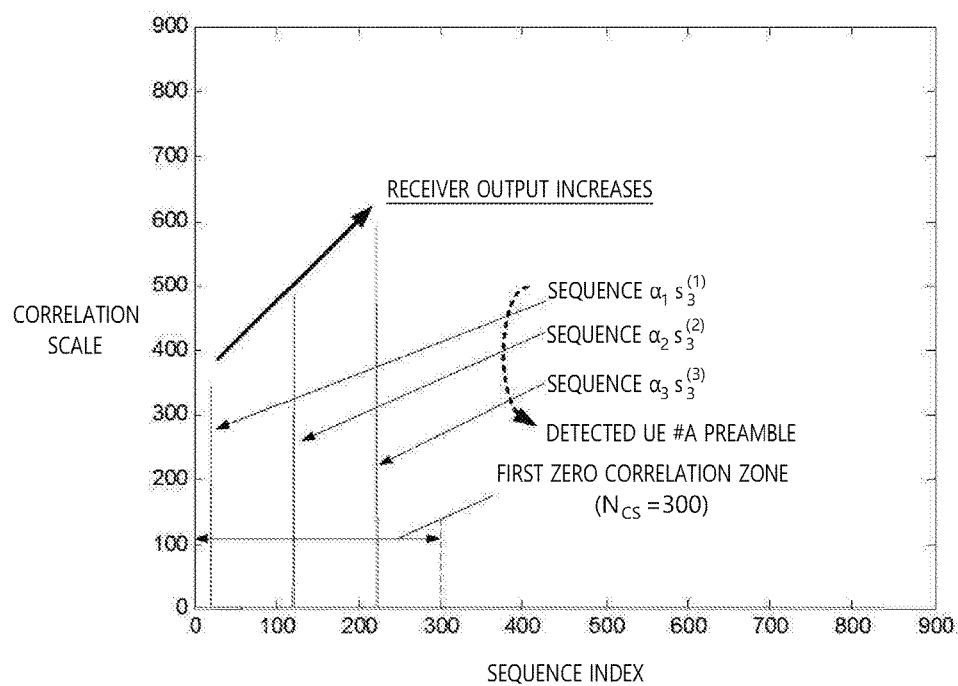
FIG. 24 illustrates one example of a case where the power ratio of the combination sequence constituting the RACH preamble is set according to an embodiment of the present invention.

FIG. 24 illustrates one example of a case where the power ratio of the combination sequence constituting the RACH preamble is set according to an embodiment of the present invention. Referring to FIG. 24, the power of the combination sequence constituting the RACH preamble increases in the order of the first, second, and third sequences. That is, the combination sequence of the RACH preamble is configured so as to increase the output of the receiver. The RACH preamble constituted by the combination sequence may be the UE that requests urgently obtaining the UL synchronization. When the eNB detects the corresponding RACH preamble, the eNB may transmit the RAR message to the corresponding UE as soon as possible.

Figure 25:
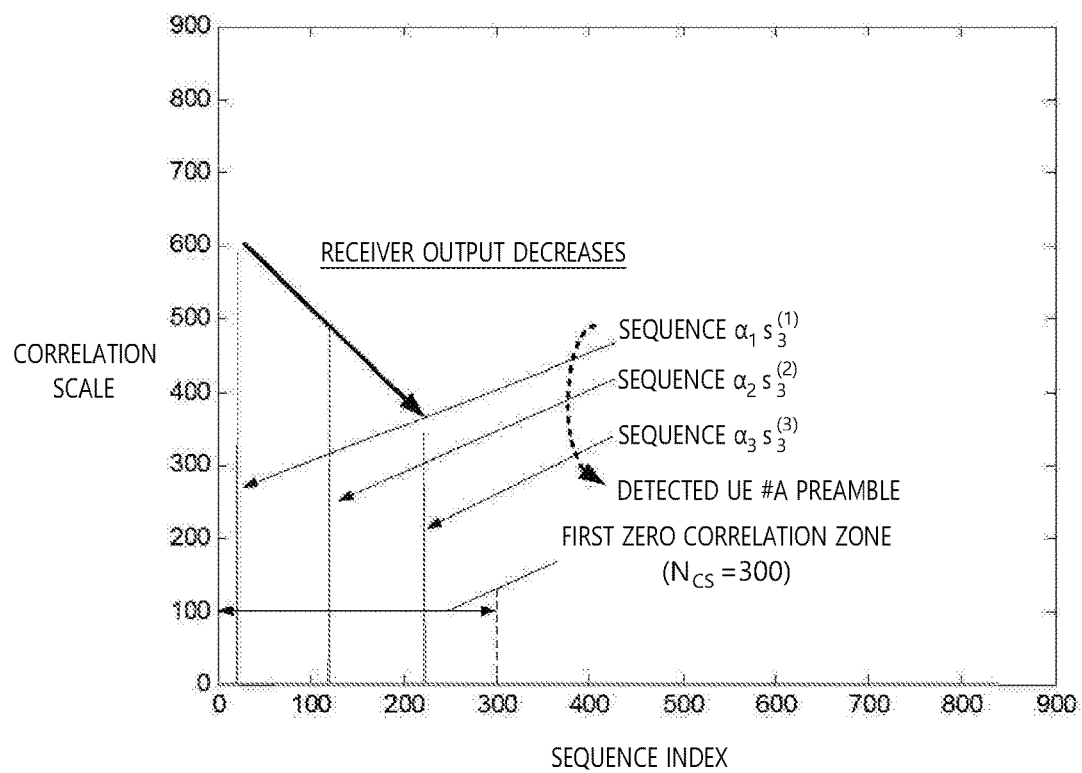
FIG. 25 illustrates another example of the case where the power ratio of the combination sequence constituting the RACH preamble is set according to an embodiment of the present invention.

FIG. 25 illustrates another example of the case where the power ratio of the combination sequence constituting the RACH preamble is set according to an embodiment of the present invention. Referring to FIG. 25, the power of the combination sequence constituting the RACH preamble decreases in the order of the first, second, and third sequences. That is, the combination sequence of the RACH preamble is configured so as to decrease the output of the receiver. The RACH preamble constituted by the combination sequence may be the RACH preamble retransmitted after a failure in a primary random access procedure. When the eNB detects the corresponding RACH preamble, the eNB may preferentially transmit the RAR message to the corresponding UE when a common search space (CSS) of the PDCCH is insufficient.

Figure 26:
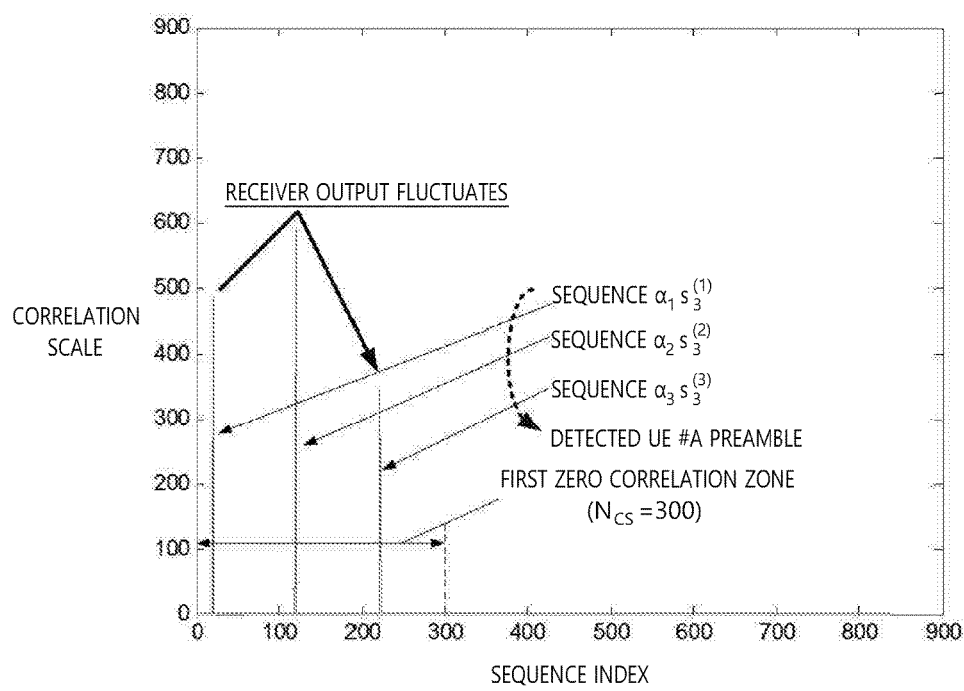
FIG. 26 illustrates yet another example of the case where the power ratio of the combination sequence constituting the RACH preamble is set according to an embodiment of the present invention.

FIG. 26 illustrates yet another example of the case where the power ratio of the combination sequence constituting the RACH preamble is set according to an embodiment of the present invention. Referring to FIG. 26, the power of the combination sequence constituting the RACH preamble increases in the order of the first and second sequences and decreases in the order of the second and third sequences. That is, the combination sequence of the RACH preamble is configured while the output of the receiver fluctuates. The RACH preamble constituted by the combination sequence may be an RACH preamble of machine-to-machine (M2M) UE or UE that requests scheduling of a UL wideband resource.

Figure 27:
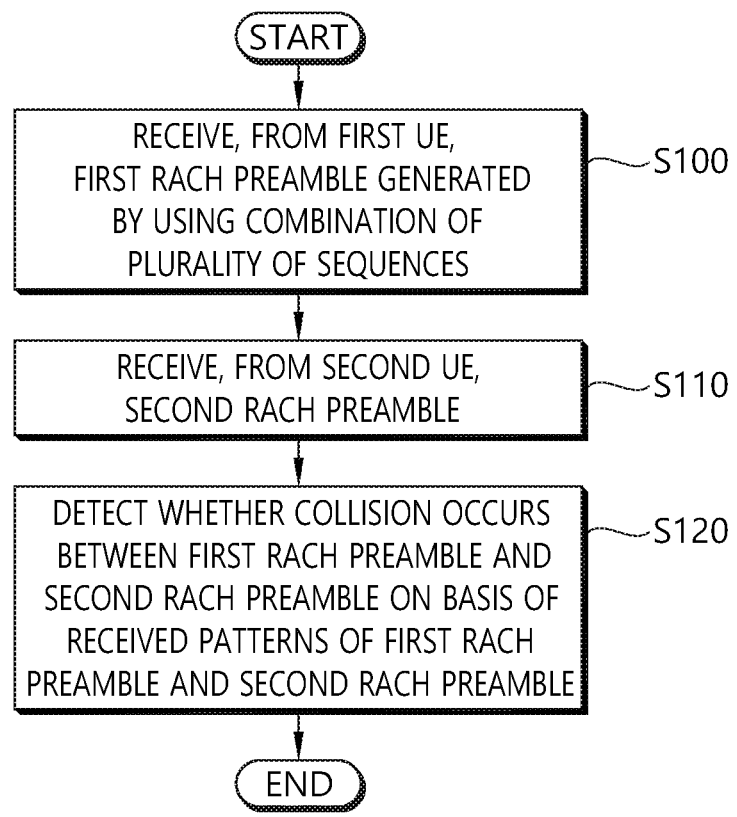
FIG. 27 illustrates a method for detecting whether the RACH preambles collide with each other according to an embodiment of the present invention.

FIG. 27 illustrates a method for detecting whether the RACH preambles collide with each other according to an embodiment of the present invention.

In step S100, the eNB receives a first RACH preamble generated by using a combination of a plurality of sequences from first UE. In step S110, the eNB receives a second RACH preamble generated by using one sequence from second UE. The first RACH preamble generated by using the combination of the plurality of sequences may follow an RACH preamble generated based on the multi-QoS sequence or combination sequence. That is, the plurality of respective sequences may belong to different sequence groups. The different sequence groups may have different cyclic shift offsets, respectively. The combination of the plurality of sequences may correspond to the sum of the plurality of sequences. Alternatively, the combination of the plurality of sequences may correspond to the sum of the plurality of sequences considering weights for the plurality of respective sequences.

In step S110, the eNB detects whether the first RACH preamble and the second RACH preamble collide with each other based on the received patterns of the first RACH preamble and the second RACH preamble. The received patterns of the first RACH preamble and the second RACH preamble are based on the channel delay by the multiple paths.

Whether the first RACH preamble and the second RACH preamble collide with each other may follow the method for detecting the collision of the RACH preambles in the channel delay environment by the multiple paths according to the embodiment of the present invention. That is, whether the first RACH preamble and the second RACH preamble collide with each other may be detected by comparing the correlations of the plurality of sequences constituting the first RACH preamble. In this case, when the received patterns of the plurality of sequences do not match each other by comparing the correlations of the plurality of sequences, the collision of the first RACH preamble and the second RACH preamble may be detected. Alternatively, whether the first RACH preamble and the second RACH preamble collide with each other may be detected by comparing the power ratios of the plurality of sequences constituting the first RACH preamble. In this case, when reception power of some sequences is larger than the reception power of the remaining sequences by comparing the power ratios of the plurality of sequences, the collision of the first RACH preamble and the second RACH preamble may be detected.

When the collision of the first RACH preamble and the second RACH preamble is detected, the eNB may preferentially transmit the RAR message to the first UE. That is, the eNB may preferentially transmit the RAR message for only the UE that transmits the RACH preamble constituted by the combination sequence. In this case, the RAR message may be based on an RA-RNTI newly defined for the first UE. The newly defined RA-RNTI may follow Equation 17 described above. Alternatively, the RAR message may include the priority value field and the priority value field may indicate that the RAR message is used for the UE that intends to preferentially obtain the UL synchronization. The eNB may receive the RRC connection request message from the first UE.

When the collision of the first RACH preamble and the second RACH preamble is not detected, the eNB may determine the service type of the first UE based on the power ratios of the plurality of sequences constituting the first RACH preamble.

Figure 28:
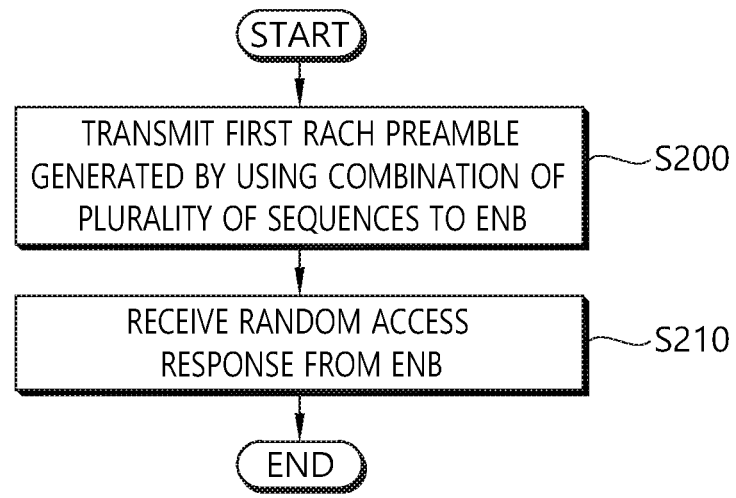
FIG. 28 is a diagram illustrating a method for performing the random access procedure according to an embodiment of the present invention.

FIG. 28 is a diagram illustrating a method for performing the random access procedure according to an embodiment of the present invention.

In step S200, the UE transmits the first RACH preamble generated by using the combination of the plurality of sequences from the eNB. The first RACH preamble generated by using the combination of the plurality of sequences may follow the RACH preamble generated based on the multi-QoS sequence or combination sequence. That is, the plurality of respective sequences may belong to different sequence groups. The different sequence groups may have different cyclic shift offsets, respectively. The combination of the plurality of sequences may correspond to the sum of the plurality of sequences. Alternatively, the combination of the plurality of sequences may correspond to the sum of the plurality of sequences considering the weights for the plurality of respective sequences.

The eNB may detect whether the RACH preambles of the plurality of UEs collide with each other based on the received pattern of the RACH preamble. The received pattern of the RACH preamble is based on the channel delay by the multiple paths. The method in which the eNB detects whether the RACH preambles of the plurality of UEs collide with each other is described above.

In step S210, when the collision of the RACH preambles is detected, the UE receives the RAR message from the eNB. The UE may be UE that intends to preferentially obtain the UL synchronization. The RAR message may be based on the RA-RNTI newly defined for the UE. Alternatively, the RAR message may include the priority value field and the priority value field may indicate that the RAR message is used for the UE that intends to preferentially obtain the UL synchronization.

Figure 29:
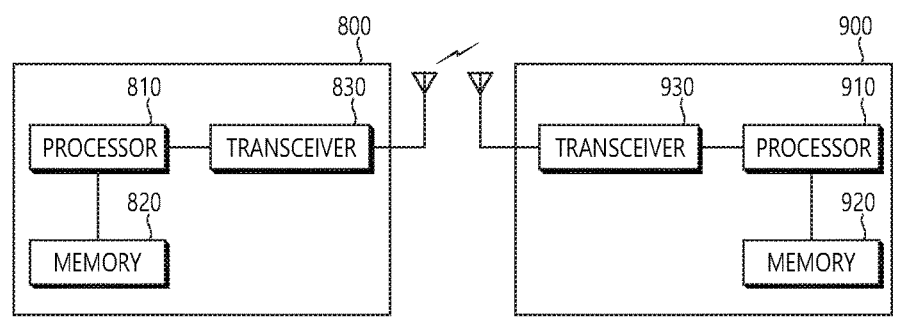
FIG. 29 shows a wireless communication system to implement an embodiment of the present invention.

FIG. 29 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for detecting whether a random access channel (RACH) preamble collision occurs by evolved NodeB (eNB) in a wireless communication system, the method comprising:
    receiving, from a first user equipment (UE), a first RACH preamble generated by using a combination of a plurality of sequences;
    receiving, from a second UE, a second RACH preamble generated by using one sequence; and
    detecting whether a collision occurs between the first RACH preamble and the second RACH preamble on the basis of the received patterns of the first RACH preamble and the second RACH preamble,
    wherein the received patterns of the first RACH preamble and the second RACH preamble are based on channel delay by multiple paths, and
    wherein whether the collision occurs between the first RACH preamble and the second RACH preamble is detected by comparing power ratios of the plurality of sequences constituting the first RACH preamble.

2. The method of claim 1, wherein whether the collision occurs between the first RACH preamble and the second RACH preamble is detected by comparing correlations of the plurality of sequences constituting the first RACH preamble.

3. The method of claim 2, wherein the collision between the first RACH preamble and the second RACH preamble is detected, when the received patterns of the plurality of sequences do not match each other by comparing the correlations of the plurality of sequences.

4. The method of claim 1, wherein the collision between the first RACH preamble and the second RACH preamble is detected, when reception power of some sequences is larger than the reception power of the remaining sequences by comparing the power ratios of the plurality of sequences.

5. The method of claim 1, further comprising:
    preferentially transmitting a random access response (RAR) to the first UE when the collision between the first RACH preamble and the second RACH preamble is detected.

6. The method of claim 5, wherein the random access response is based on a random access radio network temporary identity (RA-RNTI) newly defined for the first UE.

7. The method of claim 5,
    wherein the random access response includes a priority value field, and wherein the priority value field indicates that the random access response is used for a UE that intends to preferentially obtain uplink (UL) synchronization.

8. The method of claim 5, further comprising:
receiving a radio resource control (RRC) connection request message from the first UE.

9. The method of claim 1, further comprising:
determining a service type of the first UE based on the power ratios of the plurality of sequences constituting the first RACH preamble, when the collision between the first RACH preamble and the second RACH preamble is not detected.

10. The method of claim 1, wherein the plurality of respective sequences belong to different sequence groups.

11. The method of claim 10, wherein the different sequence groups have different cyclic shift offsets, respectively.

12. The method of claim 1, wherein the combination of the plurality of sequences corresponds to the sum of the plurality of sequences.

13. The method of claim 1, wherein the combination of the plurality of sequences corresponds to the sum of the plurality of sequences considering weights for the plurality of respective sequences.

14. An evolved NodeB (eNB) in a wireless communication system, the eNB comprising:
a memory;
a transceiver; and
a processor connected with the memory and the transceiver,
wherein the processor is configured to:
control the transceiver to receive, from a first user equipment (UE), a first RACH preamble generated by using a combination of a plurality of sequences,
control the transceiver to receive, from a second UE, a second RACH preamble generated by using one sequence, and
detect whether a collision occurs between the first RACH preamble and the second RACH preamble on the basis of the received patterns of the first RACH preamble and the second RACH preamble,
wherein the received patterns of the first RACH preamble and the second RACH preamble are based on channel delay by multiple paths, and
wherein whether the collision occurs between the first RACH preamble and the second RACH preamble is detected by comparing power ratios of the plurality of sequences constituting the first RACH preamble.

* * * * *